(12) United States Patent
Hutton et al.

(10) Patent No.: US 7,221,753 B2
(45) Date of Patent: May 22, 2007

(54) METHOD AND SYSTEM FOR PROVIDING NETWORK INTERACTIVE VOICE RESPONSE WITH INTELLIGENT CALL ROUTING INTEGRATION

(75) Inventors: Daniel Thomas Hutton, Elbert, CO (US); Belinda Ann Kent, Castle Rock, CO (US); Linda K. Davis, Colorado Springs, CO (US)

(73) Assignee: Verizon Business Global LLC, Ashburn, VA (US)

( * ) Notice: Subject to any disclaimer, the term of this patent is extended or adjusted under 35 U.S.C. 154(b) by 437 days.

(21) Appl. No.: 10/378,713

(22) Filed: Mar. 4, 2003

(65) Prior Publication Data

US 2004/0174979 A1    Sep. 9, 2004

(51) Int. Cl.
*H04M 3/00* (2006.01)
*H04M 5/00* (2006.01)

(52) U.S. Cl. .............................. 379/265.11; 379/266.01
(58) Field of Classification Search ................................
379/265.01–265.14, 266.01–266.1, 212.01,
379/211.01, 211.02, 221.02
See application file for complete search history.

(56) References Cited

U.S. PATENT DOCUMENTS

| | | | |
|---|---|---|---|
| 5,335,268 A | | 8/1994 | Kelly, Jr. et al. |
| 5,479,487 A | * | 12/1995 | Hammond .................... 379/67 |
| 5,694,459 A | * | 12/1997 | Backaus ...................... 379/427 |
| 5,787,160 A | * | 7/1998 | Chaney et al. .............. 379/220 |
| 5,796,812 A | * | 8/1998 | Hanlon et al. .............. 379/212 |
| 6,298,127 B1 | * | 10/2001 | Petrunka ...................... 379/126 |
| 6,314,089 B1 | * | 11/2001 | Szlam et al. ................. 370/270 |
| 6,349,290 B1 | * | 2/2002 | Horowitz et al. ............. 705/35 |
| 6,427,002 B2 | | 7/2002 | Campbell et al. |
| 6,496,567 B1 | | 12/2002 | Bjornberg et al. |
| 6,661,882 B1 | * | 12/2003 | Muir et al. ............ 379/127.01 |
| 6,731,609 B1 | * | 5/2004 | Hirni et al. .................. 370/260 |
| 2001/0055370 A1 | * | 12/2001 | Kommer |
| 2002/0071529 A1 | * | 6/2002 | Nelkenbaum |
| 2002/0146108 A1 | * | 10/2002 | Weissman et al. |
| 2002/0196929 A1 | * | 12/2002 | Smith et al. |
| 2003/0108183 A1 | * | 6/2003 | Dhir et al. |
| 2004/0028213 A1 | * | 2/2004 | Goss |
| 2004/0057569 A1 | * | 3/2004 | Busey et al. |

OTHER PUBLICATIONS

Davis, Paul, Cisco Systems, "Call Routing Service Protocol Specification", Revision 2.5, Aug. 17, 2001.
Genesys Telecommunications Laboratories, Inc., "NGSN T-Server Design Version 3.0", Jul. 31, 2001.

* cited by examiner

*Primary Examiner*—William J. Deane, Jr.

(57) ABSTRACT

An approach for providing interactive voice response services is disclosed. A voice response platform receives a call and generates an automated menu in response. The menu, according to one embodiment, includes an option to transfer the call to an available agent and in response thereto the voice response platform transmits a request for the available agent to an intelligent call router (ICR) over a communications network. The intelligent call router receives the request for the available agent and transmits identification information for the available agent to the voice response platform. The voice response platform then transfers the call to the available agent based on the identification information for the available agent.

32 Claims, 13 Drawing Sheets

METHOD AND SYSTEM FOR PROVIDING NETWORK INTERACTIVE VOICE RESPONSE WITH INTELLIGENT CALL ROUTING INTEGRATION

BACKGROUND OF THE INVENTION

1. Field of the Invention

The present invention relates to call routing in a communications network, and more particularly, to supporting interactive voice response and intelligent call routing.

2. Discussion of the Background

In a conventional call center, a call may first be directed into an interactive voice response (IVR) platform before the call reaches an agent to pre-screen the call. An IVR application associated with the IVR platform can query the caller for information pertinent to the call. This information retrieved from the caller is then forwarded to the call center agent as an aid for expediting the caller's request. Call centers with IVR platforms typically operate at lower cost than call centers staffed with agents performing tasks that could be performed by an IVR application. However, one drawback of the conventional IVR-configured call center is that call routing functions are limited. For example, when a call center agent has a need to pull back a call to the IVR platform, for example, to transfer the call, this is typically performed via dual tone multi-frequency (DTMF) tones. However, such auditory tones are heard by the caller, and thus, are considered undesirable by many call center customers.

Further, if the call cannot be routed to an available call center agent, the call is placed in a queue of an automatic call distributor (ACD) waiting for an agent to become available. If calls are routinely placed in the ACD queue, ACDs with larger capacity are required, thereby increasing cost.

Therefore, there is a need for providing IVR capabilities, with enhanced call routing functions.

SUMMARY OF THE INVENTION

The above and other needs are addressed by the present invention, which provides an improved system for network interactive voice response (NIVR) with intelligent call routing (ICR) integration. A voice response platform receives a call and in response generates an automated menu. The menu includes an option to transfer the call to an available agent; and in response thereto the voice response platform transmits a request for the available agent to an intelligent call router over a communications network. The intelligent call router receives the request for the available agent and transmits identification information for the available agent to the voice response platform. The voice response platform transfers the call to the available agent based on the identification information for the available agent. The voice response platform transfers the call via embedded switching capabilities or control of switching resources in the long distance network. The ability to deliver the switching functionality in the long distance network reduces the cost of the overall service versus "tromboning" calls through the ACDs. The above approach advantageously addresses the above-noted problems with respect to telecommunications systems employing IVR and ICR platforms.

According to one aspect of embodiment of the present invention, a communications system for supporting interactive voice response and call routing is disclosed. The system includes a voice response platform having network switching functionality and being configured to generate an automated menu in response a received call. The menu includes an option to transfer the call to an available agent. Also, the system includes an intelligent call router, which communicates with the voice response platform and is configured to receive the request for the available agent and to transmit identification information for the available agent to the voice response platform. The voice response platform transfers the call to the available agent based on the identification information for the available agent.

In another aspect of an embodiment of the present invention, a method for supporting interactive voice response and call routing is disclosed. The method includes generating an automated menu in response to a received call at a voice response platform. The menu includes an option to transfer the call to an available agent. Additionally, the method includes transmitting a request for the available agent from the voice response platform to an intelligent call router, wherein the intelligent call router receives the request and transmits identification information for the available agent to the voice response platform. The method further includes transferring the call to the available agent by the voice response platform based on the identification information for the available agent.

In another aspect of an embodiment of the present invention, a computer-readable medium carrying one or more sequences of one or more instructions for supporting interactive voice response and call routing is disclosed. The one or more sequences of one or more instructions include instructions which, when executed by one or more processors, cause the one or more processors to perform the steps of generating an automated menu in response to a received call at a voice response platform. The menu including an option to transfer the call to an available agent. Another step includes transmitting a request for the available agent from the voice response platform to an intelligent call router, wherein the intelligent call router receives the request and transmits identification information for the available agent to the voice response platform. Yet another step includes transferring the call to the available agent by the voice response platform based on the identification information for the available agent.

In yet another aspect of an embodiment of the present invention, a communications system for supporting interactive voice response and call routing is disclosed. The system includes means for generating an automated menu in response to a received call at a voice response platform, the menu including an option to transfer the call to an available agent. The system also includes means for transmitting a request for the available agent from the voice response platform to an intelligent call router, wherein the intelligent call router receives the request and transmits identification information for the available agent to the voice response platform. The system further includes means for transferring the call to the available agent by the voice response platform based on the identification information for the available agent.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

A method, system and computer program product for supporting network interactive voice response (NIVR) with intelligent call routing (ICR) integration, according to the present invention, are described. In the following description, for purposes of explanation, numerous specific details are set forth in order to provide a thorough understanding of the present invention. It is apparent to one skilled in the art, however, that the present invention can be practiced without these specific details or with an equivalent arrangement. In some instances, well-known structures and devices are shown in block diagram form in order to avoid unnecessarily obscuring the present invention.

Figure 1:
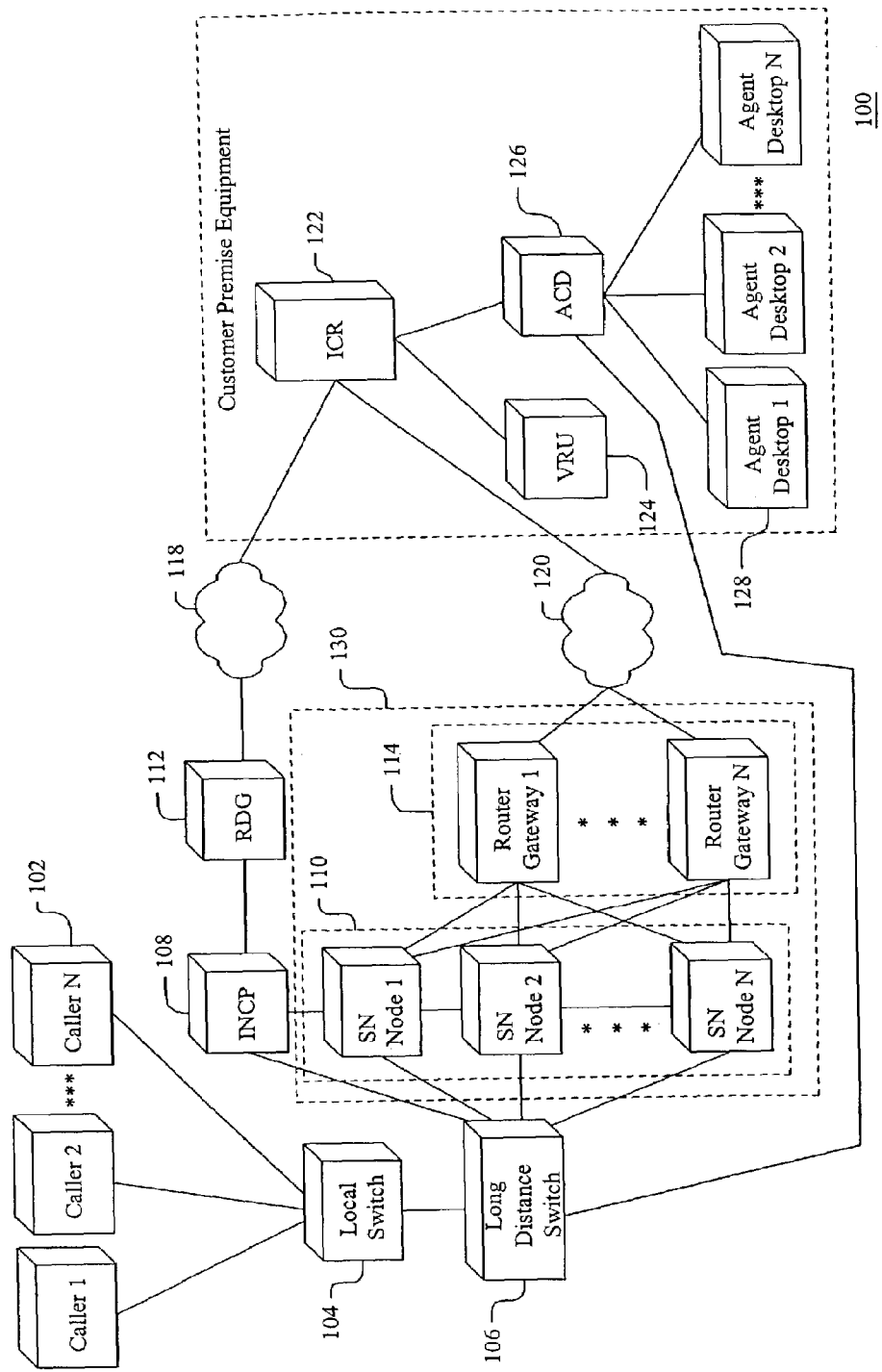
FIG. 1 is a diagram of a system for supporting network interactive voice response with intelligent call routing integration, according to an embodiment of the present invention.

Referring now to the drawings, wherein like reference numerals designate identical or corresponding parts throughout the several views, and more particularly to FIG. 1 thereof, there is illustrated is a block diagram of a system 100 for network interactive voice response (NIVR) with intelligent call routing (ICR) integration, according to an embodiment of the present invention. In FIG. 1, the system 100 includes one or more callers 102 coupled via a local switch 104 to a network long distance (LD) switch 106. The long distance switch 106 is coupled to intelligent network control point (INCP) 108 and service node (SN) platform 110, including one or more SN nodes. The SN platform 110 supports various IVR functionalities, and is more fully described in commonly-assigned U.S. Pat. No. 6,496,567 of Bjornberg, et al., entitled "Interactive voice response service node with advanced resource management," issued on Dec. 17, 2002, which is incorporated herein by reference in its entirety.

The INCP 108 provides call routing and call handling information to long distance switches and NIVR platforms. The SN nodes can include multiple Application Server (AS) node components, a varying number of Intelligent Peripherals (IPs), and an SS7 signaling gateway, and can be managed as a single logical instance. The SN nodes of the SN platform 110 are further described in commonly-owned U.S. Pat. No. 6,427,002 of Campbell et al., entitled "Advanced interactive voice response service node," issued on Jul. 30, 2002, incorporated by reference herein. The Application Server node components can include a set of servers that store provisioning data, call plans, and voice files for an SN node of the SN platform 110. External connections to an SN node of the SN platform 10 can be made through the Application Server components. The Intelligent Peripherals can include SN node voice processing front-end systems of the SN platform 110, wherein network ports can be located on these systems. The SS7 signaling gateway is a redundant gateway at each SN node of the SN platform 110, and which provides the SS7 interface with the telephony network.

As shown in FIG. 1, the SN platform 110 includes one or more SN nodes 1 . . . N. The SN platform 110 is coupled to the INCP 108 and router platform 114, which includes one or more router gateways 1 . . . N. The INCP 108 is coupled to remote data gateway (RDG) 112. The RDG 112 is coupled to ICR 122 via communications network 118. The RDG 112 is an application allowing routing directions to be provided to the INCP 108 by an external routing engine.

The ICR 122 is used to route customer inbound calls based on priority, geography, time-of-day, day-of-week, etc. The router platform 114 is coupled to the ICR 122 via communications network 120. The ICR 122 is coupled to voice response unit (VRU) 124 and ACD 126, which has connectivity to one or more agent desktops 128. The ICR 122 is more fully described in commonly-assigned U.S. Pat. No. 5,787,160 of Chaney et al., entitled "Intelligent Routing of Special Service Calls," issued on Jul. 28, 1998, and commonly-assigned U.S. Pat. No. 5,335,268 of Kelly, Jr. et al., entitled "Intelligent Routing of Special Service Telephone Traffic," issued on Aug. 2, 1994; the entireties of both are incorporated herein by reference.

The VRU 124 has an Application Engine (AE), including a version of the VRU 124 driver that reads call plans and executes service independent building block (SIBB) nodes in a call plan. Accordingly, a call plan includes service logic implemented when a call is received on the NIVR platform 130 and a sequence of SIBBs that define the actions that will be taken. The SIBBs are indivisible building blocks that provide call-processing functionality. Such building blocks can be designed to be product/service independent and to be used across multiple products with parameters used to tailor them for specific products.

The devices 122–128 can constitute customer premise equipment, such as provided in a call center, etc., while one or more of the devices 110 and 114 can constitute a NIVR platform 130 provided for one or more of such customer premise equipment. The devices 102–128 can include various hardware and/or software devices, such as hand-held devices, personal digital assistants (PDAs), Internet appliances, personal computers, laptop computers, cellular phones, hand-held wireless devices, telephony devices, telephony switches, facsimile devices, etc. Accordingly, the devices 102–128 are any suitable servers, workstations, personal computers (PCs), other devices, etc., capable of performing the processes of the present invention. One or more of the device 102–128 can be implemented, for example, via one or more computer systems, as described with respect to FIG. 14. In the examples included, agents 128 are used generically to define a customer service resource. This may selection of a particular agent or selection of a member of a particular skill group as provisioned in the ACD.

In FIG. 1, the devices 102–128 can communicate with each other using, for example, network communications, wireless communications, cellular communications, satellite communications, plain old telephone service (POTS), public switched telephone network (PSTN), advanced mobile phone service (AMPS), Transmission Control Protocol/Internet Protocol (TCP/IP), etc. The devices 102–128 can communicate with each other using any suitable protocol and, for example, over the communications networks 118 and 120. On or more of the devices 102–128 can include a modem function (e.g., dial-up, Digital Subscriber Line (DSL), cable, wireless, etc.) that can log in to a respective device 102–128 with user validation and authentication (e.g., via a personal identification number (PIN), user name and password, etc.). Accordingly, one or more of the devices 102–128 can include software and hardware to provide, for example, user account maintenance, user login and authentication, a directory server, etc.

It is to be understood that the system in FIG. 1 is for exemplary purposes only, as many variations of the specific hardware used to implement the present invention are possible, as will be appreciated by those skilled in the relevant arts. For example, the functionality of the one or more of the devices 102–128 can be implemented via one or more programmed computers or devices. To implement such variations as well as other variations, a single computer (e.g., the computer system 1401 of FIG. 14) can be programmed to perform the special purpose functions of one or more of the devices 102–128 shown in FIG. 1. On the other hand, two or more programmed computers or devices, for example as in shown FIG. 14, can be substituted for any one of the devices 102–128. Principles and advantages of distributed processing, such as redundancy, replication, etc., can also be implemented as desired to increase the robustness and performance of the system 100, for example.

The communications networks 118 and 120 can be implemented via one or more communications networks (e.g., the Internet, an Intranet, a wireless communications network, a satellite communications network, a cellular communications network, a Public Switched Telephone Network (PSTN), a hybrid network, etc.), as will be appreciated by those skilled in the relevant art(s). In a preferred embodiment of the present invention, the communications networks 118 and/or 120 and/or one or more of the devices 102–128 preferably use electrical, electromagnetic, optical signals, etc., that carry digital data streams, as are further described with respect to FIG. 14.

The system 100 allows interfacing of the SN platform 110 with multiple, varying brand routers, such as the ICR 122, at the customer's premises, advantageously, providing enhanced call routing (ECR) call treatments, for example, including in-network parking, call interrupt, third party call control, and takeback and transfer (TNT) features using embedded switching functionality, further described, to customers wanting to use their existing premises based ICRs 122 in conjunction with the NIVR platform 130. In addition, the system 100 provides the opportunity to target customers wanting to utilize Managed Services with existing ICRs 122.

The system 100 moves network intelligence to end points, the parking platform, and the ICRs 122, making integration of new types of ICRs 122 quick and with minimal development. The SN platform 110 is able to communicate with various ICRs 122, depending on the customer's application being run, using an application programming interface (API). The messages are translated into the ICR 122 specific language and sent to the appropriate ICR 122 for processing. With such interface, the SN platform 110 provides current toll-free and other capabilities, as well the third party call control, in-network parking, and out-of-band transfer features to such new customers. Advantageously, new ICR 122 types can be added and supported with minimal effort by the system 100.

The NIVR platform 130 can send all traditional information as well as additional information that results from, for example, a database lookup, etc. Signaling from the agent 128 to the NIVR platform 130 is generated out-of-band, hence, the caller 102 hears no tones. The ICR 122 can reroute calls to a queue in the NIVR platform 130, thus saving customers the cost of added hardware. Additionally, the caller 102 can perform other activities, such as database searches, browse the Web, etc., making wait times seem shorter for the caller 102. Smaller business customers, advantageously, do not have to purchase larger ACDs for their call centers due to the integration of the ICR 122 with the NIVR platform 130 in the system 100. Accordingly, the NIVR platform 130 can be controlled as if it were an extension of the customer's premise equipment.

The integration of the NIVR platform 130 with the ICR 122, advantageously, provides a market distinguisher in providing a customer control of a network resource. Thus, advantageously, a new category of customers can be targeted, and offerings for existing customers can be enhanced. Larger customers that have premises ICRs 122, but would like to take advantage of the NIVR capabilities, can also be targeted. Such new customers can be offered existing capabilities provided to current UVR customers as well as the additional Call interrupt/Third Party Call Control, in-network queuing and out-of-band TNT/Transfer features. Such new feature offerings can also be made available to existing customers. Added flexibility is provided with direct data exchange (e.g., Caller Entered Digits (CED), host connect, etc.) between the ICR 122 and the NIVR platform 130, eliminating size limitations currently imposed by the INCP 108 and the RDG 112.

Applicability with in-network ICRs 122 is possible in order to provide the noted features to customers who have in-network solutions (e.g., Managed Contact Solutions (MCS), such as Cisco (MCS-C), MCS-Genesys (MCS-G), etc.). Accordingly, applicability to customers employing ECR, voice portal, managed contact solutions, etc., advantageously, is made possible. With NIVR platform 130 and the ICR 122 platform integration, customers can enjoy the following features and benefits, as described with reference to FIGS. 1–4.

Third Party Call Control/Call Interrupt

Third Party Call Control provides a customer the option of placing call processing intelligence on a platform (e.g., ICR 122, etc.) other then the NIVR platform 130. The NIVR platform 130 executes the instructions received by the controlling platform (e.g., ICR 122, etc.). The NIVR platform 130 is capable of transmitting and receiving both solicited and unsolicited messages from the ICR 122, once a dialogue has been established by the NIVR platform 130 for a particular call.

Call Interrupt provides the capability of bringing a call back to the NIVR platform 130 after the call has been released from the NIVR platform 130. The NIVR platform 130 can release the call through mechanisms, such as Release-Link Trunking (RLT) in a PSTN environment, call transfer or re-invite in a SIP VoIP environment, etc. RLT includes the ability to release NIVR platform 130 network resources by releasing the bridge of inbound and outbound call segments to a bridging switch. This allows NIVR resources to be freed up to service subsequent calls, rather than passing the call through the NIVR platform 130. For example, upon receipt of a message from the ICR 122, the NIVR platform 130 would signal the network to return the call to the NIVR platform 130 for subsequent treatment. The call can be returned to the same physical node of the NIVR platform 130 or another instantiation (e.g., another SN node) in the network depending on the network topology involved.

Figure 2:
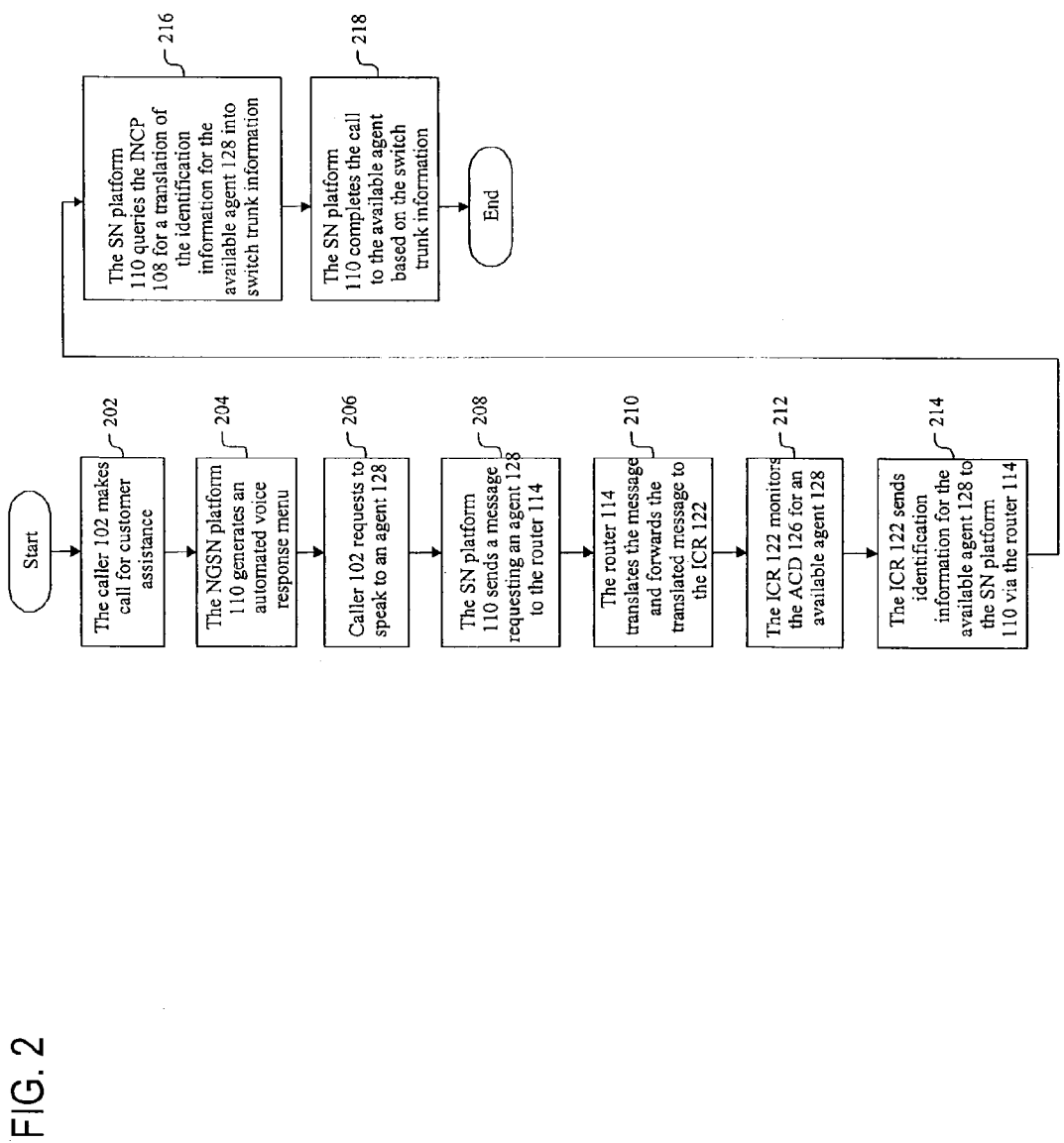
FIGS. 2–4 are flowcharts of the call processing supported by the system of FIG. 1.

FIG. 2 is a flowchart illustrating Third Party Call Control with call interrupt capability. In FIG. 2, at step 202, the caller 102, for example, makes call for customer assistance (e.g., via an 8XX toll free number, a Direct Distance Dialing (DDD) number, etc.). At step 204, the SN platform 110 receives the call via the local switch 104 and the long distance switch 106 and, for example, generates an automated voice response menu for the caller 102. At step 206, the caller 102, for example, selects to speak to an available agent 128, for example, of a sales department, via the automated voice response menu.

At step 208, the SN platform 110 sends a message requesting information for routing a call to an available agent 128 to the router platform 114. At step 210, the router platform 114 translates the request to a format usable by the ICR 122 and transmits the translated request message to the ICR 122 over the communications network 120. At step 212, the ICR 122 receives the translated request message and monitors the ACD 126 for an available agent 128. At step 214, the ICR 122 receives identification information for an available agent 128 (e.g., a destination label for an available agent 128) from the ACD 126 and transmits the identification information to the SN platform 110 via the communications network 120 and the router platform 114, which translates such information to a format usable by the SN platform 110. At step 216, the SN platform 110 queries the INCP 108 for a translation of the identification information for the available agent 128 into routing information (e.g., switch/trunk group information, DDD information, new application identification (ID) information with Dialed Number Identification Service (DNIS) overwrite digits specifying a switch/trunk group that can be used to do an outdial, etc.). At step 218, the SN platform 110 completes the call from the caller 102 to the available agent 128 based on the routing information, completing the Third Party Call Control process.

In-Network Queuing or Parking

With the integration of the NIVR and ICR 122 platforms, when the ICR 122 determines that an appropriate agent/agent group 128 is not available to take a call from the caller 102, the ICR 122 can route the call to the NIVR platform 130 to be queued, while awaiting availability of one of the agents 128 with the desired skills. While the call is queued, the ICR 122 monitors for availability of the agents 128. Parking/Queuing refers to a call that is in a queued state waiting for an identified target agent 128 resource to become available. When a call is in the queued state, the ICR 122 has control of the call and monitors the agent 128 status determining when the agent 128 is available so the call can be routed. Upon detection of a change in status of the agents 128, the ICR 122 instructs the NIVR platform 130 to connect the call to the newly available agent 128. The SN platform 110 executes a parking application, while waiting for a message from the ICR 122 to transfer the call to the newly available agent 128. For example, such parking applications can include playing of music, and/or messages, etc. to the caller 102 while being parked.

Figure 3:
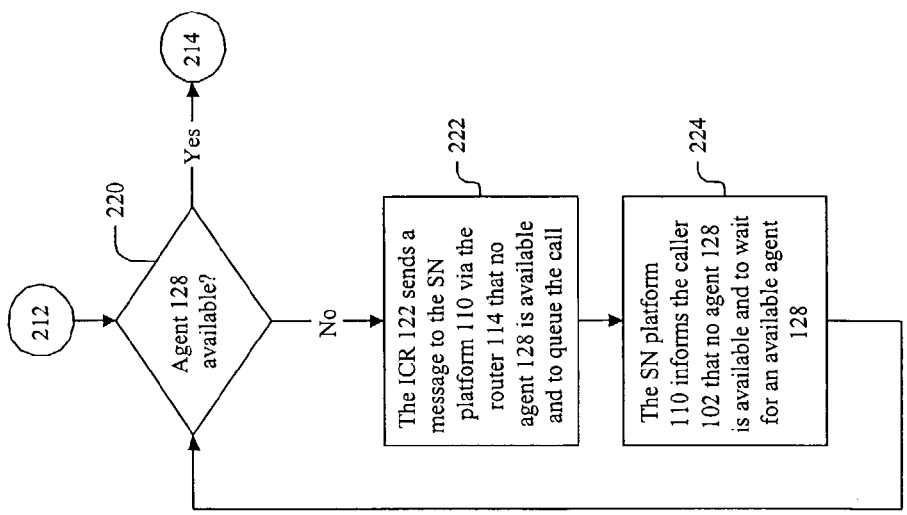

FIG. 3 is a flowchart illustrating in-network queuing or parking. In FIG. 3, from step 212 of FIG. 2, the ICR 122 monitors the ACD 126 for an available agent 128, at step 220. If it is determined at step 220 that an agent 128 is available, control transfers to step 214 of FIG. 2 for call completion. If, however, it is determined at step 220 that an agent 128 is not available, at step 222, the ICR 122 sends a message to the SN platform 110 via the communications network 120 and the router platform 114 that no agent 128 is available and to queue or park the call. At step 224, the SN platform 110 informs the caller 102 that no agent 128 is available and, for example, to wait for an available agent 128 and control transfers back to step 220, competing the queuing or parking process.

Out-of-Band Signaling

An agent 128 is able to send an out-of-band signal to the ICR 122 to indicate a call transfer. The ICR 122 in turn notifies the NIVR platform 130, which results in the tearing down of a current bridge and reconnecting to a new destination provided by the ICR 122. Such out-of-band TNT, advantageously, provides a capability to transfer calls, for example, without the use of DTMF tones.

Figure 4:
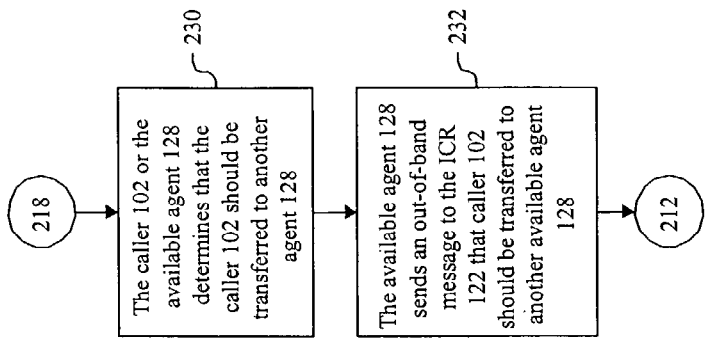

FIG. 4 is a flowchart illustrating out-of-band TNT/Transfer. In FIG. 4, from step 218 of FIG. 2, the caller 102 or the available agent 128 determines that the caller 102 should be transferred to another agent 128, for example, in a technical assistance department, at step 230. At step 232, the available agent 128 sends an out-of-band message (i.e., a message without the use of DTMF tones) to the ICR 122 that caller 102 should be transferred to another available agent 128 and control transfers to step 212 of FIG. 3 for call completion, completing the out-of-band TNT/Transfer process. The out-of-band message can be generated, for example, by the available agent 128 selecting a button, menu, etc., provided via a client application running on a desktop workstation of the available agent 128. Further features and enhancements, including data exchange, messaging, label translation, port management, router tables, call records, parking reports, call detail information transmission, session control, exemplary applications, server/platform interaction, and message and call flows, will now be described with reference to FIG. 1 and FIGS. 3–13.

Expanded Data Exchange Capability

The NIVR platform 130 can send/receive traditional information, as well as additional information needed to make call progress decisions, via an expanded message set. This information can include data sent to the ICR 122 that was solicited from the customer through a sophisticated customer service application. The ICR 122 could return data via this expanded message set interface, which includes, for example, routing information, data used to select subsequent actions in the NIVR platform 130, such as what message to play or data retrieved from a customer relationship management (CRM) database and which the NIVR platform 130 can present to the customer, such as account balance, payment information, etc.

Messaging Translation and Distribution

Messaging middleware, acting as a message translator and distributor, is utilized to interface between various ICRs 122 and the NIVR platform 130. This allows for the NIVR platform 130 to communicate with the various ICRs 122 using a single application program interface (API). The NIVR platform 130, advantageously, provides a layer of security and an ability to, for example, provision new 8XX numbers and ICR 122 associations.

Listener Process

A Listener process is implemented to enable the SN platform 110 to receive messages from the ICR 122 via a messaging middleware interface. For example, a service independent building block (SIBB) (e.g., a WAIT MESSAGE SIBB) is placed into each application that is designed for Third Party Call Control. In this way, the receipt of a message stops or interrupts execution and executes the next SIBB, which could be sending a response to the ICR 122 and waiting for the next instruction.

Message Transmission

The transmission of messages from the SN platform 110 to the ICR 122, via the messaging middleware interface, also is accomplished, for example, by a SIBB (e.g., a SEND MESSAGE SIBB) that is placed in applications that require an ICR 122 dialogue to be established.

Destination Label Translation

A message is introduced in the interface between the SN platform 110 and the INCP 108, which allows the SN platform to directly query the INCP 108 for translation of a destination label (DL). The ICR 122 interface, for example, allows for the ICR 122 to instruct the SN platform 110 to connect a call to a provided destination label. Prior to connecting, the SN platform 110 has the destination label translated. The INCP 108 can be provisioned to return, for example, a switch/trunk group, DDD number, Application ID, etc.

Corporate/8XX Parking Port Management

When a corporation buys the in-network call parking service, a number of parking slots can be agreed upon between the NIVR platform 130 provider and the customer. Accordingly, the system 100 can limit a number of consecutive calls that can be queued on the SN platform 110. In one embodiment, the various ICRs 122 handle parking slot management. However, when the ICR 122 is implemented, for example, with a Cisco router, which lacks such capability, such feature can be built into ICR 122 scripts for each 8XX number.

Customer to Router Association Table

An ICR 122 association table is provided for associating a particular application to a specified ICR 122 and to ensure that NIVR routing queries are sent to the correct ICR 122 instance. For ease of provisioning, this association occurs at a highest level of granularity possible, but can be implemented at the application level, if necessary. The receipt of a data feed (e.g., Netcap, RDG 112, etc.) could potentially elevate the provisioning concerns. A Customer could be a business segment, a corporation, an enterprise entity, etc.

Platform Call Records

Platform Call Records (PCR) are modified to provide queue time detail in order for a reporting system to provide parking usage reports, as further described, to the customers. This information is gathered, for example, for each instance of network queuing.

Parking Reports

Reports are generated to provide parking details, for example, for customers as well as internal SN platform 110 capacity engineers. These reports include details, for example, such as maximum and average queue depth, maximum and average park times, number of calls abandoned while parked, etc. N+1 Group Management When the SN platform 110 is used as an in-network parking resource, the provisioned trigger in the INCP 108, for example, can be the ICR 122. Accordingly, if when the INCP 108 queries the ICR 122 for instruction, and the ICR 122 determines that an agent 128 is not available to accept an incoming call, the ICR 122 sends a message to the INCP 108 indicating that the call is to be parked on the SN platform 110. Customer Parking applications, like other call processing applications, advantageously, can be distributed across N+1 Groups. The INCP 108 then distributes the parking calls across the members of the N+1 Groups, based upon instructions received from the SN platform 110.

If SN platform 110 provides a pre-route call treatment, the provisioned trigger in the INCP 108, for example, can be the SN platform 110. Again, the INCP 108 distributes the incoming call across members of the N+1 Group based upon instructions received from the SN platform 110. If in the course of processing the call, a query to the ICR 122 results in an instruction to park the call, the call remains on the initial SN platform 110.

Non-Interruptible Initial Greetings

A customer may want to ensure that an initial message (e.g., a legal notice) is played in its entirety before being transferred to an available agent 128. In the case of the Parking only applications, this can be accomplished by building the parking application such that the dialogue is not established with the ICR 122 until after the message has completed. In the cases where the dialogue has already been established, the initial message can be built to be non-interruptible and if a VRUCancel message is received prior to the completion of this message, a Dialogue Error Result message with the status code set to Not Cancelled can be sent.

Custom Parking Applications by Dialed Number

The ICR 122 also is capable of using existing criteria (e.g., 8XX, ANI, CED, Dialed Number, etc.) available to determine the parking applications to be used for each incoming call. Advantageously, this provides a customer the flexibility to define unique parking message flows for different 8XX numbers, customer segments, or DTMF entered, so the callers 102 could activate different informational recordings, etc. A customer also can define a single parking application for all dialed numbers.

Communications Interface

The NIVR platform 130, including the SN platform 110 and the messaging middleware, implements a communications interface to establish basic connectivity between the VRU 124 and the ICR 122. In the case of the Cisco CRSP ICR/VRU, the SN platform 110 plays the client role and initiates the opening of a communications session. In this case, the SN platform 110 is provisioned with an Internet Protocol (IP) address and User Datagram Protocol (UDP) port number of a Network Interface Card (NIC) on the CRSP server and a Client ID to identify different processes within a single service control point (SCP).

Once a connection has been established, the connection remains in place until a failure occurs or either the SN 110 platform or the CRSP server closes the session. The CRSP interface includes exchange of keep-alive message to detect network failures.

Figure 5:
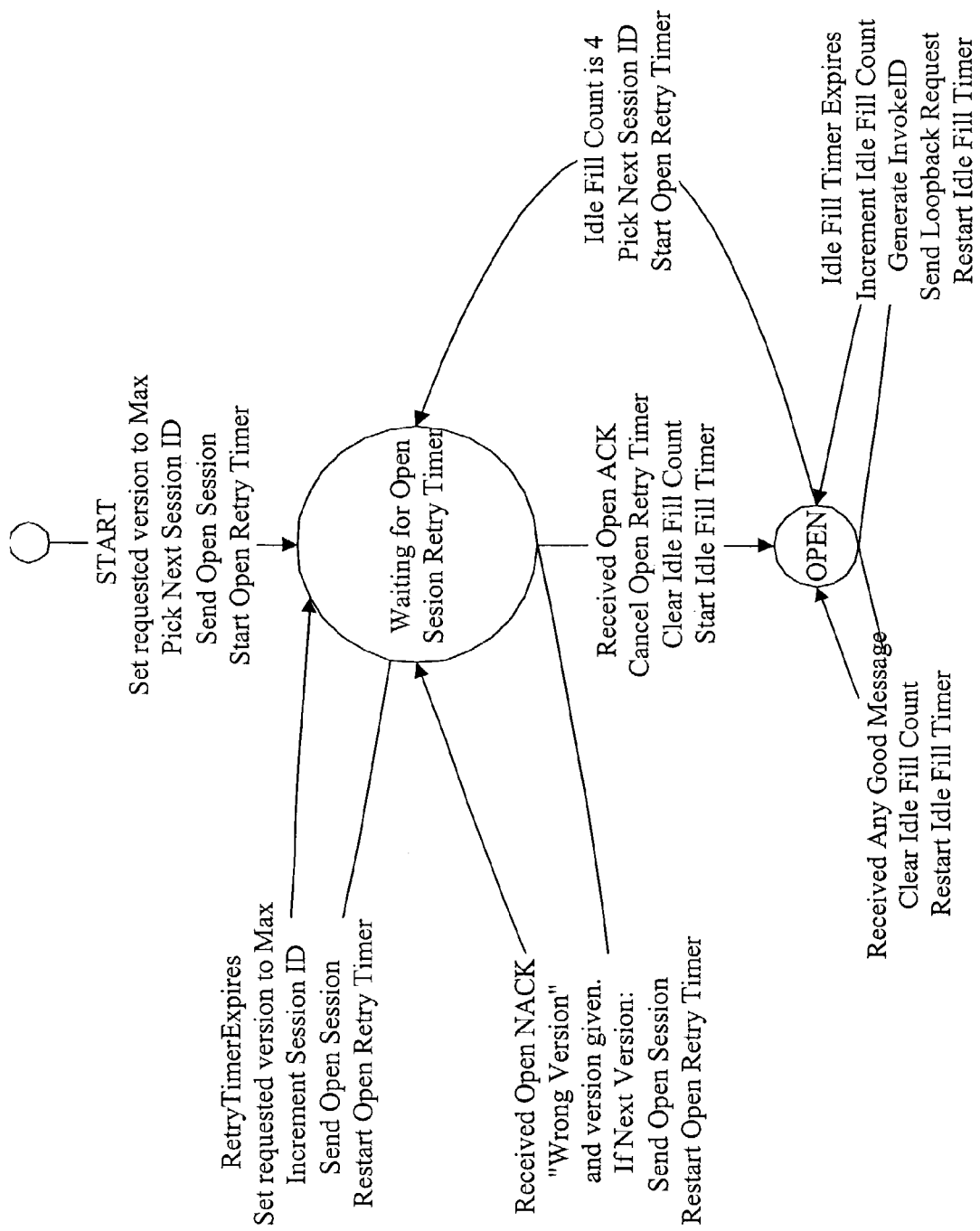
FIG. 5 is a state diagram for session control utilized in the system of FIG. 1.

With the UDP connection established, the SN platform 110 attempts to open a new call routing session, for example, by sending an Open Session message to the UDP port assigned to the CRSP server. The CRSP server responds with either an Open ACK message or an Open NACK message. Only one session may be allowed for each client. FIG. 5 illustrates an exemplary Session Control State Diagram, as described above.

Application Level Interface

The SN platform 110 implements the CRSP Interface from the available Application Level Interfaces. The CRSP Interface offers the additional Call Transfer capability, which is employed for out-of-band transfers.

Call Routing Service Protocol Interface

The CRSP Interface enables an ICR 122 Script to determine the call handling steps that are performed by the VRU 124. Once initialized, the interface allows the ICR 122 to respond to the VRU 124 route queries or to control calls by selecting services, for example, as in the Third Party Call Control. Calls are routed to the SN platform 110 via the INCP 108, thus, the INCP 108 is responsible for load balancing and assigning the actual target. The SN platform 110 initiates a dialogue for each call that utilizes the services of the ICR 122 (e.g., a Cisco Router).

The SN platform 110 provides a unique identifier and a sequence number when the dialogue is initialized. The dialogue ID (e.g., 4 bytes) is unique within the life of the dialogue. The SN platform sets the sequence number to one for the first message. The CRSP server also sets the sequence number of the first reply message to one. Thereafter, each side uses the next higher sequence number when it sends a message for that particular call routing dialogue. Each time a message is received, the receiver checks its Sequence Number against the Sequence Number of the previous message for that Dialogue ID. If the sequence number on a message is less than or equal to the previous sequence number received, the message can be ignored, as being a duplicate or out of order message. If the sequence number on a message is more than one greater than the previous sequence number received, the message can be processed.

VRU Routing Classes

Cisco®, for example, has defined four VRU 124 classes, which can use the CRSP Interface. The significant difference in classes is the way that a Connect message is processed. Table 1 below defines the differences in the connect processing.

TABLE 1

VRU Class Description

| Class | Routing Message | Description |
| --- | --- | --- |
| 0 | Connect | The Connect message includes a label that directs the call to a VRU 124. |
| 1 | Temporary Connect | The Temporary Connect message includes a label and a Correlation ID. The label directs the call to a VRU 124 and the PSTN passes the Correlation ID to the VRU 124. The VRU 124 contacts the CRSP server to get instructions for the call identified by the Correlation ID. |
| 2 | Connect to Resource | The Connect to Resource message includes a label. The label directs the call to a VRU 124 and the PSTN acts as a gateway between the VRU 124 and CRSP server. |
| 3 | none | The VRU 124 creates a call routing dialogue by sending a New Call message and the CRS exchanges VRU 124 messages with the VRU 124 until the CRS directs the call elsewhere. |

Figure 6B:
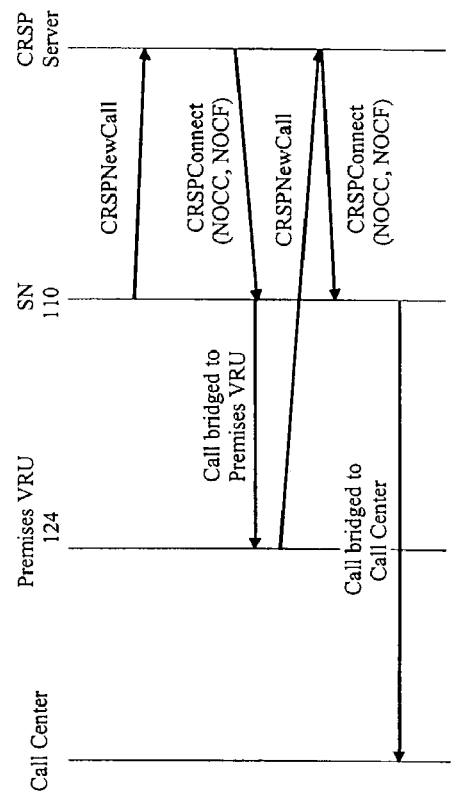
FIG. 6b is a message flow diagram involving a premise voice response unit, in accordance with an embodiment of the present invention.
Figure 6A:
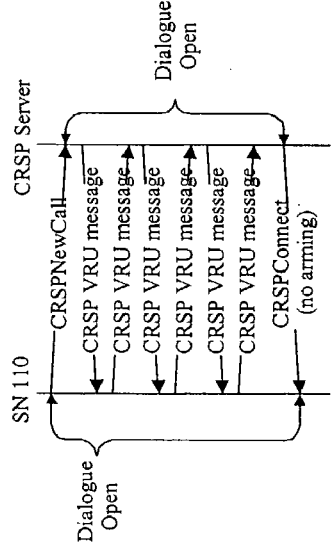
FIG. 6a is a message flow diagram between a server and a voice response platform, according to an embodiment of the present invention.

The SN platform 110, for example, supports the VRU 124 class 3 model. In this model, the SN platform 110 is capable of either interacting with the caller 102 in a network IVR role or bridging the call to a customer premises VRU 124 for caller 102 interaction, with the SN platform 110 being used for call transfer capability. The SN platform 110 corresponds with the customer's premises CRSP server using CRSP VRU messages to get route instructions. FIG. 6a illustrates an example of a CRSP server and Class 3 NIVR interaction and FIG. 6b illustrates the message flow, if a premise VRU 124 is involved.

Exemplary Call Flows

In a preferred embodiment, the SN platform 110 is the IVR platform for ICR 122 integration. For billing purposes, time spent in parking is considered platform time and can be billed at current tariff eliminating the need to change entry codes. The caller 102 (channel 1) can be parked, with a single caller 102 being able to be parked multiple times, if TNT is enabled. A Whisper capability can be used for attended transfers when parking is required. Advantageously, this allows an agent 128 (channel 2) to leave a recorded message for the next agent 128 after parking. The message then can be heard by the agent 128 prior to the call being connected. The parking applications can include routing decisions that have been made prior to parking the call and a possible interaction that the platform has with the caller 102 is a menu route with an option to hold or to default route and/or playing of predefined messages and/or music, etc. If parking and TNT are enabled on a single application, channels other the channel 1 can have a forced hang-up prior to parking the caller 102. ECR applications provisioned on the SN platform 110 for a Corporation or Customer ID can use the same ICR 122. In this way, advantageously, the Corporate or Customer router association table can only go to the Corporate ID level and not the application level. This greatly simplifies the coordination and provisioning of applications, which are integrated with the ICR 122 platform.

Figure 7:
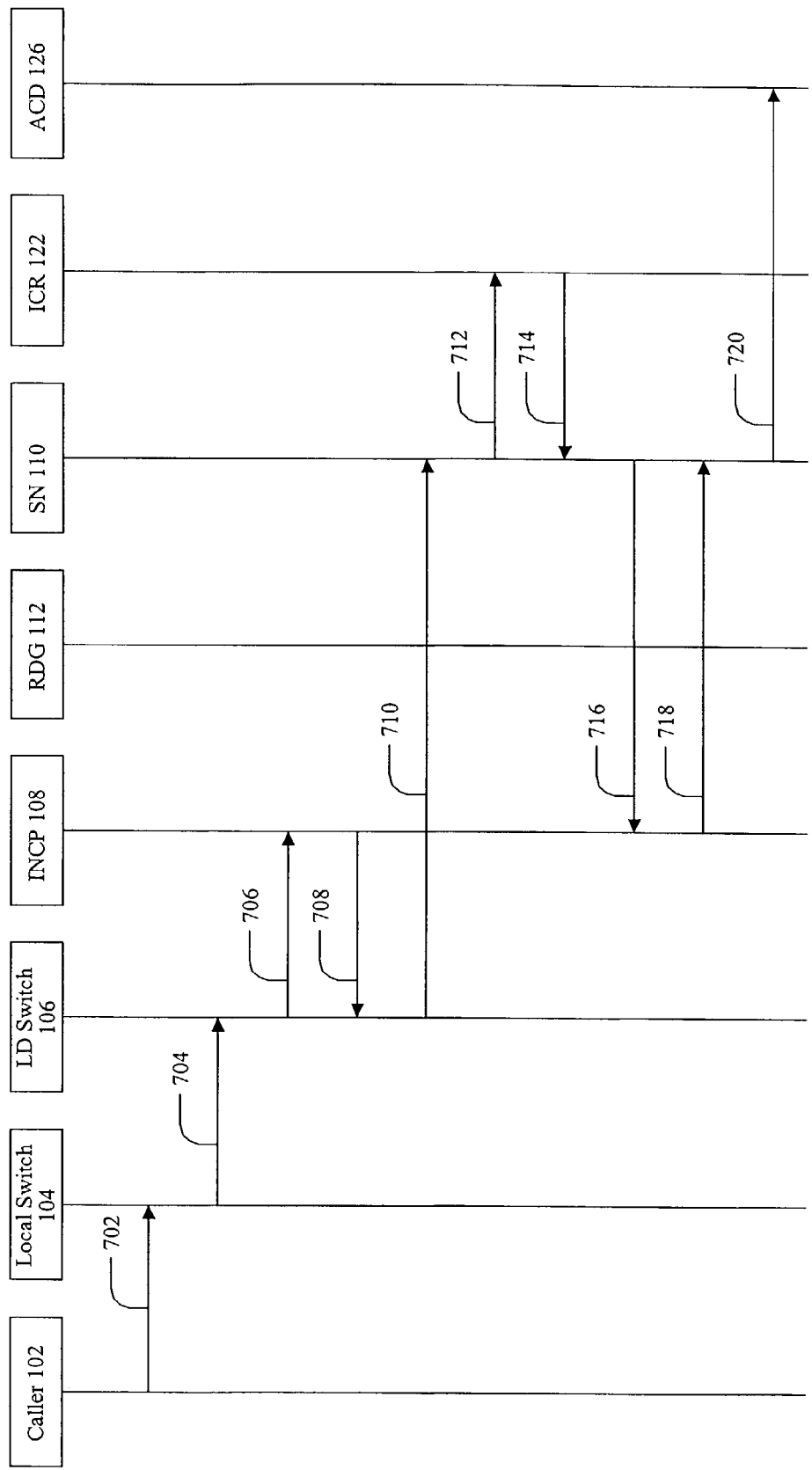
FIG. 7 is a diagram of Pre-Route Call Treatment without Parking Call Flow employed with an exemplary intelligent call router, according to an embodiment of the present invention.

FIGS. 7–13 illustrate exemplary call flows of an embodiment employing an exemplary ICR 122 (e.g., from Cisco). FIG. 7 illustrates an exemplary SN platform 110 Pre-Route Call Treatment without Parking Call Flow.

In FIG. 7, the Caller 102 Dials, for example, an 8XX number at step 702. At step 704, the LEC Switch 104 performs SMS/8XX database lookup, selects the NTVR platform service provider as a destination carrier and delivers call to the long distance switch 106. At step 706, the long distance switch 106 analyzes the dialed digits, and, since an 8XX number was dialed, queries the INCP 108 for routing instructions.

At step 708, the INCP 108 looks up a routing tree for the dialed number and encounters a trigger point specifying the SN platform 110. The INCP 108 then uses the load balancing information provided by the SN platform 110 to determine which SN node to send the call to. The INCP 108 then responds to the long distance switch 106 with the Switch/trunk group associated to that particular SN node and outpulse digits specifying the application ID to be used. Then, at step 710, the long distance switch 106 terminates the call at the specified SN node.

At step 112, the SN platform 110 interacts with the caller 102. The application then encounters a SEND MESSAGE SIBB specifying the CRSPNewCall. The SN platform 110 then sends the message to the Router Gateway platform 114 where it is distributed to the appropriate ICR 122.

At step 714, the ICR 122 uses the 8XX, ANI, and CED included in the request to determine target agent 128 and checks for agent availability. The target agent 128 is available so the routing engine responds with a CRSPConnect message with the destination label of the intended recipient agent 128.

At step 716, the SN platform 110 queries the INCP 108 for a translation via the interface. Then, at step 718, the INCP 108 returns the Switch/Trunk group, and, at step 720, the SN platform 110 connects the call to the switch/Trunk group specified in the INCP 108 translation.

Figure 8:
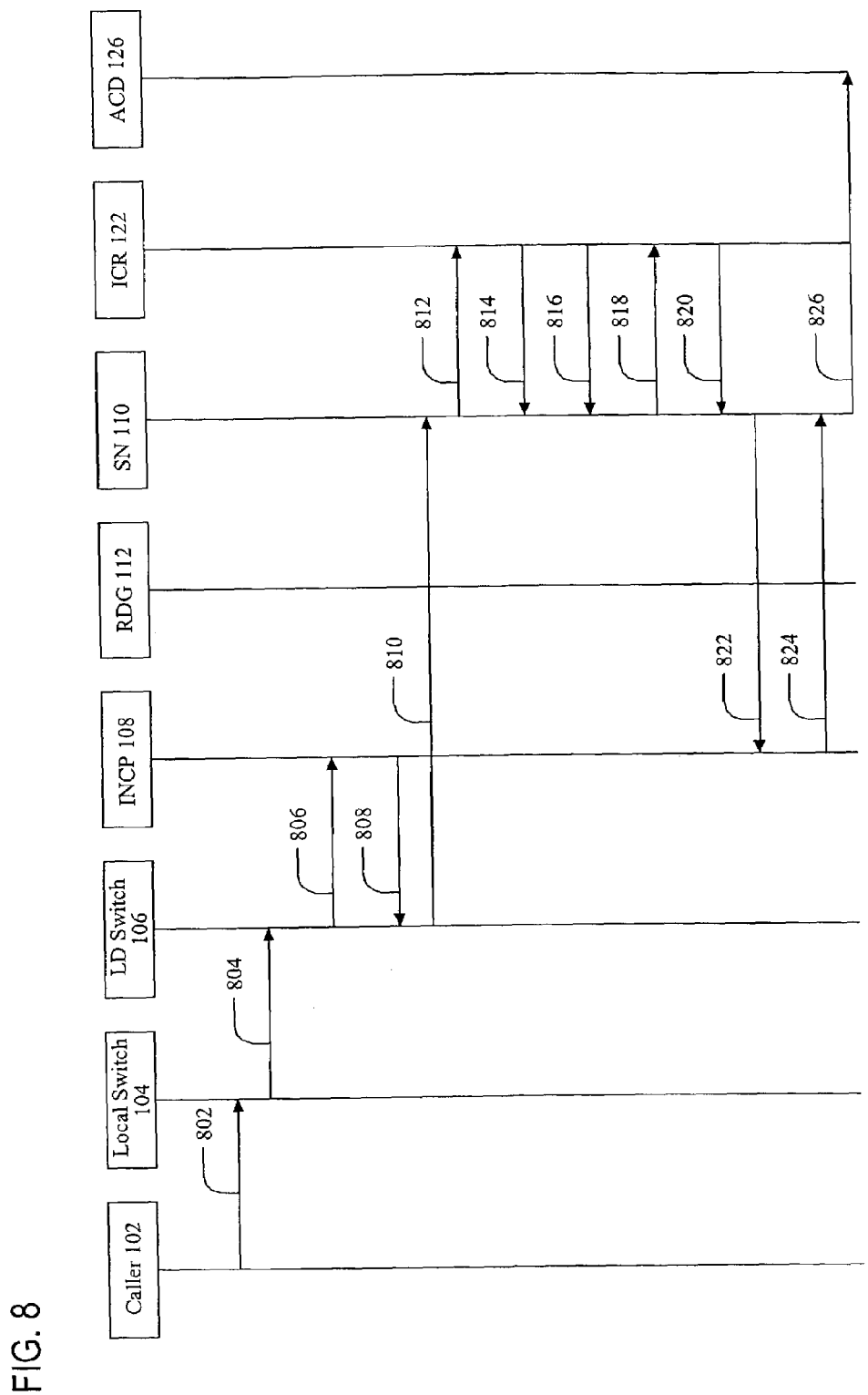
FIG. 8 is a diagram of Pre-Route Call with Parking Call Flow employed with an exemplary intelligent call router, according to an embodiment of the present invention.

FIG. 8 illustrates an exemplary SN platform 110 Pre-Route Call with Parking Call Flow. In FIG. 8, the Caller 102 Dials, for example, an 8XX number at step 802. At step 804, the LEC Switch 104 performs SMS/8XX database lookup, selects the NIVR platform 130 service provider as a destination carrier and delivers call to the long distance switch 106. At step 806, the long distance switch 106 analyzes the dialed digits, and, since an 8XX number was dialed, queries the INCP 108 for routing instructions.

At step 808, the INCP 108 looks up a routing tree for the dialed number and encounters a trigger point specifying the SN platform 110. The INCP 108 then uses the load balancing information provided by the SN platform 110 to determine which SN node to send the call to. The INCP 108 then responds to the long distance switch 106 with the Switch/trunk group associated to that particular SN node and outpulse digits specifying the application ID to be used. Then, at step 710, the long distance switch 106 terminates the call at the specified SN node.

At step 812, the SN platform 110 interacts with the caller 102. The application then encounters a SEND MESSAGE SIBB specifying the CRSPNewCall. The SN platform 110 then sends the message to the Router Gateway platform 114 where it is distributed to the appropriate ICR 122.

At step 814, the ICR 122 uses the 8XX, ANI, and CED included in the request to determine target agent 128 and checks for agent availability. The target agent 128 is not available so the routing engine responds with a CRSPVRURunScript message specifying the parking application rather then sending a CRSPConnect message. The SN platform 110 then JUMPs to the parking application, which includes an Audio Play SIBB with an initial greeting message, e.g., "All agents are busy please hold for the next available agent . . ." followed by a WAIT MESSAGE SIBB, which plays either a repeating message or music while waiting for a message from the ICR 122.

At step 816, the ICR 122 detects a configuration change with the intended agent 128 and sends a CRSPVRUCancel message to the SN platform 110. At step 118, the SN platform 110 responds, via the SEND_MESSAGE SIBB, with an CRSPDialogueErrorResult with the error code set to canceled indicating that the CRSPVRURunScript has been canceled. At step 820, The ICR 122 sends the CRSPConnect message, which includes the destination label for the target agent 128.

At step 822, the SN platform 110 queries the INCP 108 for a translation via the interface. Then, at step 824, the INCP 108 returns the Switch/Trunk group, and, at step 826, the SN platform 110 routes the call to the switch/Trunk group specified in the INCP 108 translation.

Figure 9:
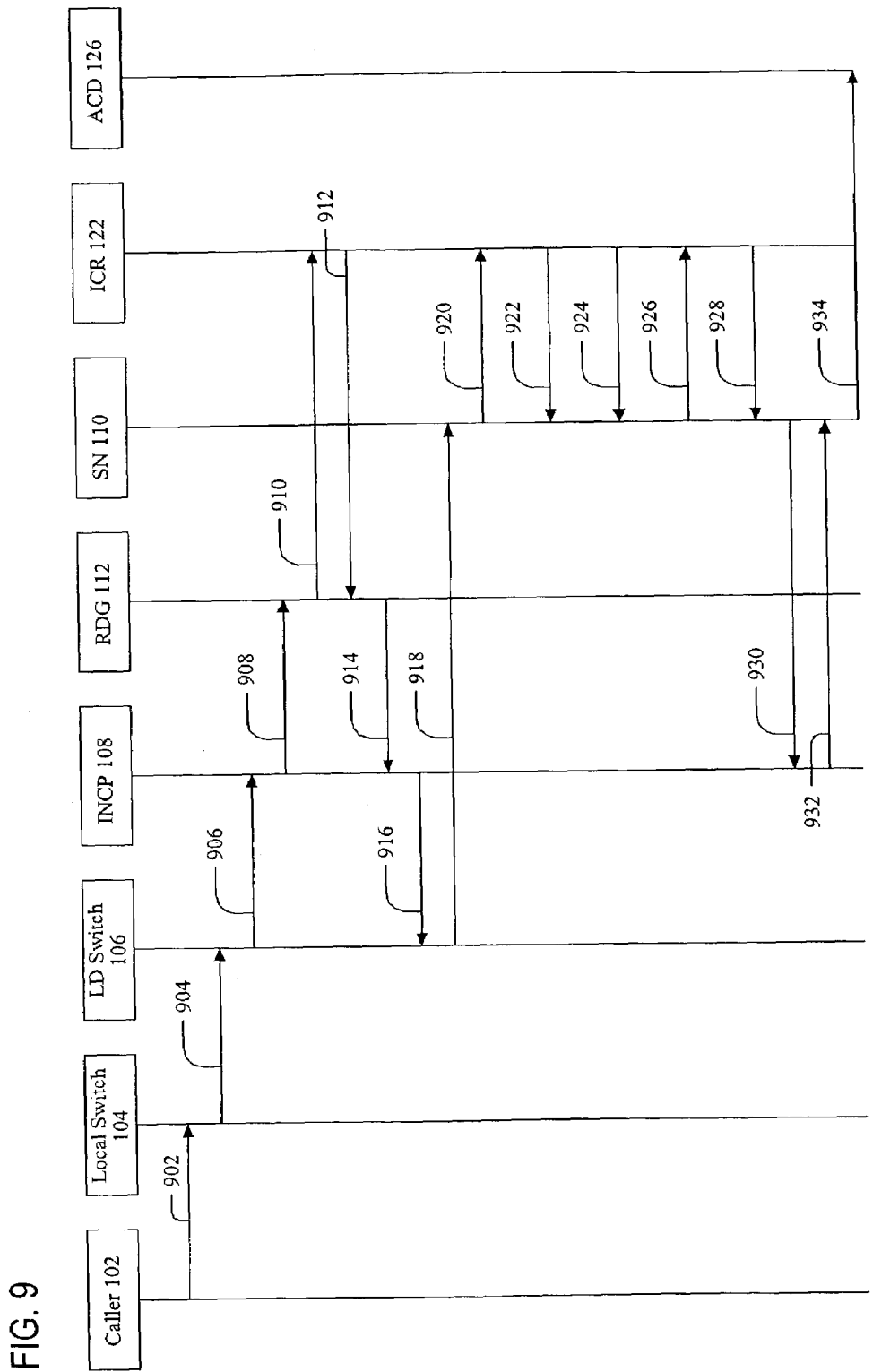
FIG. 9 is a diagram of parking Only Call Flow employed with an exemplary intelligent call router, according to an embodiment of the present invention.

FIG. 9 illustrates an exemplary SN platform 110 Parking Only Call Flow. In FIG. 9, the Caller 102 Dials, for example, an 8XX number at step 902. At step 904, the LEC Switch 104 performs SMS/8XX database lookup, selects the NIVR platform 130 service provider as a destination carrier and delivers call to the long distance switch 106. At step 906, the long distance switch 106 analyzes the dialed digits, and, since an 8XX number was dialed, queries the INCP 108 for routing instructions.

At step 908, the INCP 108 encounters a trigger point in Toll-free number translation and requests services from the RDG 112. At step 910, the RDG 112 sees that this trigger point employs a query to the ICR 122 and makes the query. At step 912, the ICR 122 uses the 8XX number, and ANI included in the request to determine a target agent 128 and checks for agent availability. The target agent 128 is not available so the routing engine responds to the RDG 112 with a Destination label for the SN platform 110 with the outpulse digits indicating the parking application.

At step 914, the RDG 112 responds to the INCP 108. At step 916, using the load balancing information provided by the SN platform 110, the INCP 108 translates the destination label to a trunk group and sends it to the long distance switch 106. At step 918, the long distance switch 106 sends the call to the SN platform 110 where the parking only application is invoked. At step 920, the version of the parking application includes a SEND MESSAGE STBB with a CRSPNewCall message, which establishes a dialogue with the ICR 122.

At step 922, the ICR 122 checks for agent 128 availability, and, if an agent 128 is not available, responds with a CRSPVRURunScript message specifying the generic parking application. The platform then JUMPs to the generic parking application, which includes an Audion Play SIBB with an initial greeting message, e.g., "All agents are busy please hold for the next available agent . . . " followed by a WAIT MESSAGE SIBB, which plays either a repeating message or music while waiting for a message from the ICR 122.

At step 924, the ICR 122 detects a configuration change with the intended agent 128 and sends a VRUCancel message to the SN platform 110.

At step 926, the WAIT MESSAGE SIBB breaks with the receipt of the new message. The SN platform 110 responds, via the SEND_MESSAGE SIBB, with a CRSPDialogueErrorResult message with the error code set to canceled indicating that the CRSPVRURunScript has been canceled.

At step 928, the ICR 122 then sends the CRSPConnect message, which includes the destination label for the target agent 128.

At step 930, the SN platform 110 queries the INCP 108 for a translation via the interface. Then, at step 932, the INCP 108 returns the Switch/Trunk group, and, at step 934, the SN platform 110 routes the call to the switch/Trunk group specified in the INCP 108 translation.

Figure 10:
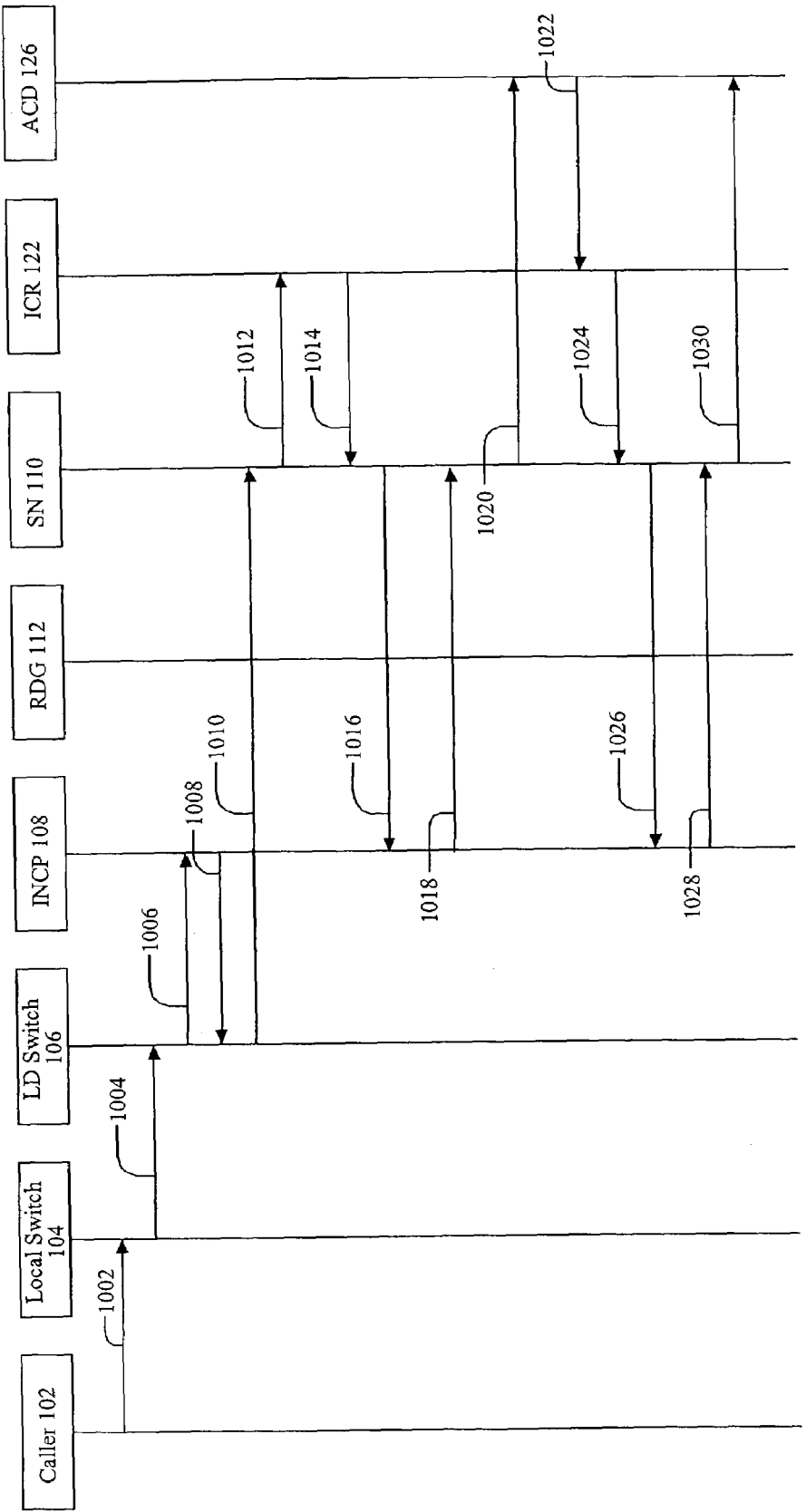
FIG. 10 is a diagram of Takeback and Transfer (TNT) without Parking Call Flow employed with an exemplary intelligent call router, according to an embodiment of the present invention.

FIG. 10 illustrates an exemplary SN platform 110 TNT without Parking Call Flow. In FIG. 10, the Caller 102 Dials, for example, an 8XX number at step 1002. At step 1004, the LEC Switch 104 performs SMS/8XX database lookup, selects the NIVR platform 130 service provider as a destination carrier and delivers call to the long distance switch 106. At step 1006, the long distance switch 106 analyzes the dialed digits, and, since an 8XX number was dialed, queries the INCP 108 for routing instructions.

At step 1008, the INCP 108 looks up a routing tree for the dialed number and encounters a trigger point specifying the SN platform 110. The INCP 108 then uses the load balancing information provided by the SN platform 110 to determine which SN node to send the call to. The INCP 108 then responds to the long distance switch 106 with the Switch/trunk group associated to that particular SN node and outpulse digits specifying the application ID to be used. Then, at step 1010, the long distance switch 106 terminates the call at the specified SN node.

At step 1012, the SN platform 110 interacts with the caller 102. The application then encounters a SEND MESSAGE SIBB indicating that it is ready to outdial. The SN platform 110 then sends a route query via the NewCall message to the ICR 122 interface.

At step 1014, the ICR 122 uses the 8XX, ANI, and CED included in the request to determine target agent 128 and checks for agent availability. The target agent 128 is available so the routing engine responds with a CRSPConnect message with the destination label of the intended recipient agent 128.

At step 1016, the SN platform 110 queries the INCP 108 for a translation via the interface. Then, at step 1018, the INCP 108 returns the Switch/Trunk group, and, at step 1020, the SN platform 110 bridges the call to the leg1 agent 128, waits for the call to be answered and sends an answered event message to the ICR 122 and then waits for any subsequent messages from the ICR 122.

Upon receiving a subsequent Connect message at steps 1022 and 1024, the SN platform 110 breaks down the existing bridge and queries the INCP 108 for a translation at step 1026. Then, at step 1028, the INCP 108 returns the Switch/Trunk group, and, at step 1030, the SN platform 110 routes call to the leg2 agent 128 and when the leg2 agent 128 picks up, the SN platform 110 bridges the caller 102 to leg2 and waits for the call to be answered and sends an answered event message to the ICR 122 and again waits for any subsequent messages from the ICR 122. This process continues until the caller 102 hangs-up.

Figure 11:
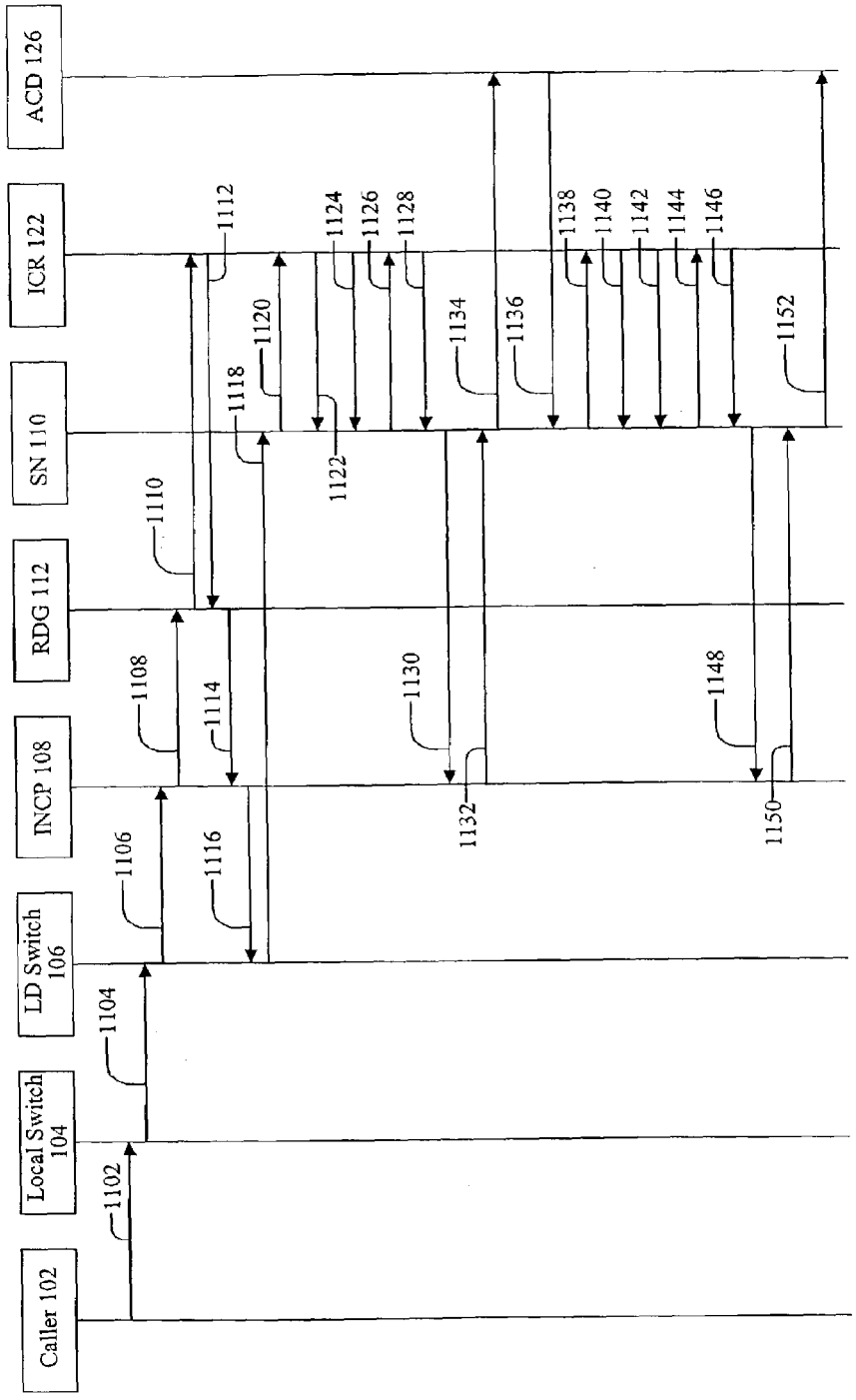
FIG. 11 is a diagram of TNT with Parking Call Flow employed with an exemplary intelligent call router, according to an embodiment of the present invention.

FIG. 11 illustrates an exemplary SN platform 110 TNT with Parking Call Flow. In FIG. 11, the Caller 102 Dials, for example, an 8XX number at step 1102. At step 1104, the LEC Switch 104 performs SMS/8XX database lookup, selects the NIVR platform 130 service provider as a destination carrier and delivers call to the long distance switch 106. At step 1106, the long distance switch 106 analyzes the dialed digits, and, since an 8XX number was dialed, queries the INCP 108 for routing instructions.

At step 1108, the INCP 108 encounters a trigger point in Toll-free number translation and requests services from the RDG 112. At step 1110, the RDG 112 sees that this trigger point employs a query to the ICR 122 and makes the query. At step 1012, the ICR 122 uses the 8XX number, and ANI included in the request to determine a target agent 128 and checks for agent availability. The target agent 128 is not available so the routing engine responds to the RDG 112 with a Destination label for the SN platform 110 with the outpulse digits indicating the parking application.

At step 1114, the RDG 112 responds to the INCP 108. At step 1116, using the load balancing information provided by the SN platform 110, the INCP 108 translates the destination label to a trunk group and sends it to the long distance switch 106. At step 1118, the long distance switch 106 sends the call to the SN platform 110 where the parking only application is invoked. At step 1120, the version of the parking application includes a SEND MESSAGE SIBB with a CRSP-NewCall message, which establishes a dialogue with the ICR 122.

At step 1122, the ICR 122 checks for agent 128 availability, and, if an agent 128 is not available, responds with a CRSPVRURunScript message specifying the generic parking application. The platform then JUMPs to the generic parking application, which includes an Audio Play SIBB with an initial greeting message, e.g., "All agents are busy please hold for the next available agent . . . " followed by a WAIT MESSAGE SIBB, which plays either a repeating message or music while waiting for a message from the ICR 122.

At step 1124, the ICR 122 detects a configuration change with the intended agent 128 and sends a VRUCancel message to the SN platform 110.

At step 1126, the WAIT MESSAGE SIBB breaks with the receipt of the new message. The SN platform 110 responds, via the SEND_MESSAGE SIBB, with a CRSPDialogueErrorResult message with the error code set to canceled indicating that the CRSPVRURunScript has been canceled.

At step 1128, the ICR 122 then sends the CRSPConnect message, which includes the destination label for the target agent 128. At step 1130, the SN platform 110 queries the INCP 108 for a translation via the interface. Then, at step 1132, the INCP 108 returns the Switch/Trunk group.

At step 1134, the SN platform 110 routes the call to the leg1 agent 128 and when the leg1 agent 128 picks up, the SN platform 10 bridges the caller 102 to leg1 agent 128 and listens, in an INPUT SIBB, for TNT DTMF (or other TNT indication). The caller 102 and the leg1 agent 128 converse and either the caller 102 or the leg1 agent 128 decides to TNT the call in order to bridge the caller 102 to a leg2 agent 128.

At step 1136, upon hearing the TNT DTMF tones, the SN platform 110 starts executing the application again. At step 1138, the application dictates that a query to the ICR 122 be made and so the SN platform 110 sends a RequestInstruction to the ICR 122.

At step 1140, the ICR 122 uses the information provided to determine the new target agent 128. The ICR 122 then looks to see if the leg2 agent 128 is available and determines that the agent 128 is not available. The ICR 122 responds with a VRURunScript message specifying the generic parking application. The platform JUMPs to the parking application, which includes an Audio Play SIBB with an initial greeting message, e.g., "All agents are busy please hold for the next available agent . . . " followed by a WAIT MESSAGE SIBB, which plays either a repeating message or music while waiting for a message from the router.

At step 1142, the ICR 122 detects a configuration change with the intended agent 128. When an agent 128 becomes available, the ICR 122 sends a VRUCancel message to the SN platform 110.

At step 1144, the WAIT MESSAGE SIBB breaks with the receipt of the new message. The SN platform 110 responds, via the SEND_MESSAGE SIBB, with a CRSPDialogueErrorResult message with the error code set to canceled indicating that the VRURunScript has been canceled. At step 1146, the ICR 122 then sends the Connect message that includes the destination label for the target agent 128. At step 1148, the SN platform 110 queries the INCP 108 for a translation. At step 1150, the INCP 108 returns the Switch/Trunk group. At step 1152, the SN platform 110 routes the call to the leg2 agent 128 and when the leg2 agent 128 picks up, the SN platform 110 bridges the caller 102 to the leg2 agent and once again listens for TNT DTMF (or other TNT indication). This process continues until the caller 102 hangs-up.

Figure 12:
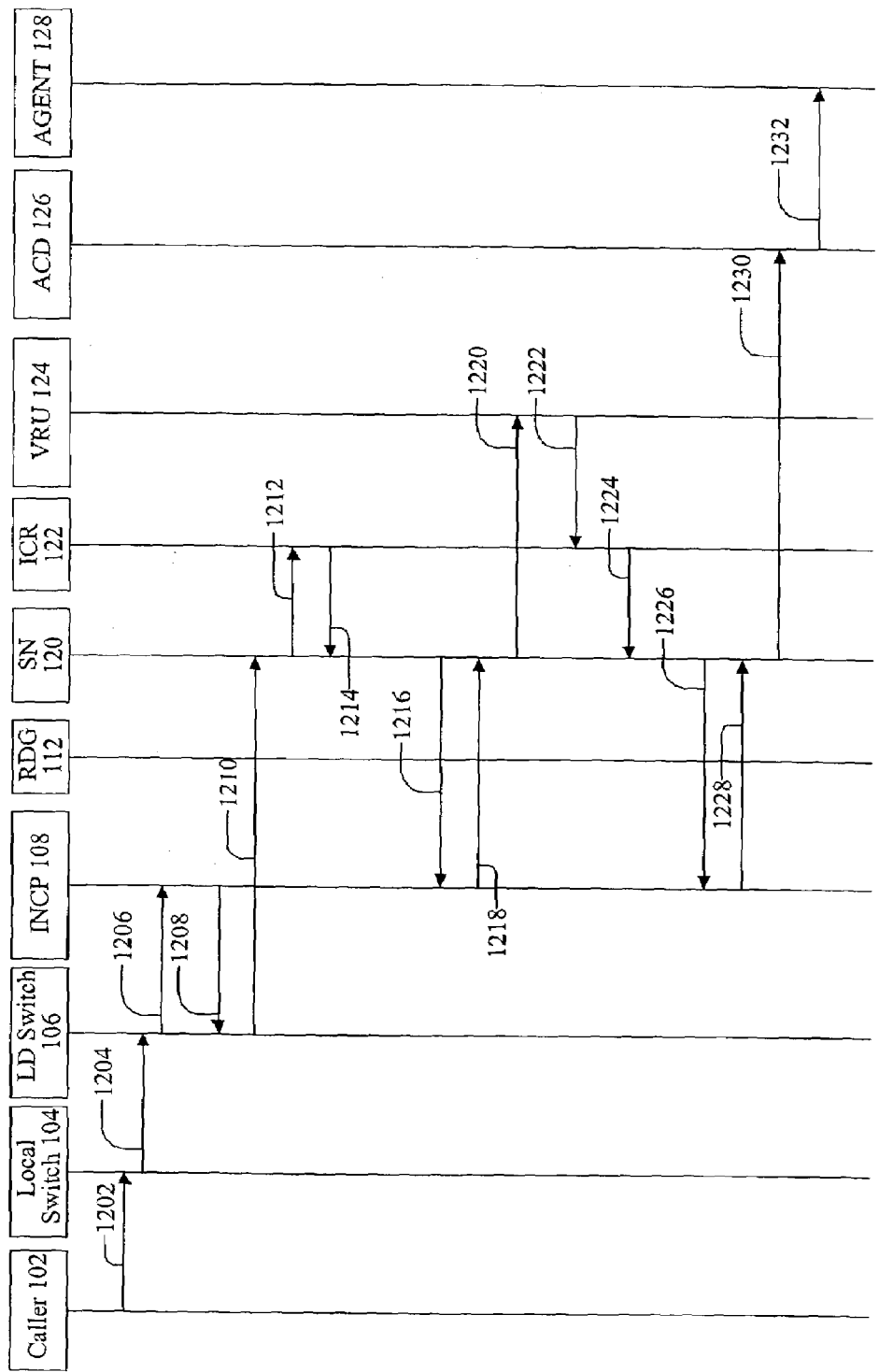
FIG. 12 is a diagram of Customer Premises VRU Call Flow without Parking employed with an exemplary intelligent call router, according to an embodiment of the present invention.

FIG. 12 illustrates an exemplary Customer Premises VRU 124 Call Flows without Parking. In FIG. 12, the Caller 102 Dials, for example, an 8XX number at step 1202. At step 1204, the LEC Switch 104 performs SMS/8XX database lookup, selects the NIVR platform 130 service provider as a destination carrier and delivers call to the long distance switch 106. At step 1206, the long distance switch 106 analyzes the dialed digits, and, since an 8XX number was dialed, queries the INCP 108 for routing instructions.

At step 1208, the INCP 108 encounters an SN platform 110 trigger point in Toll-free number translation and uses the load balancing information provided by the SN platform 110 to determine which SN node to send the call to. The INCP 108 responds to the long distance switch 106 with the Switch/trunk group associated to that particular SN node and outpulse digits specifying the application ID to be used.

At step 1210, the long distance switch 106 terminates the call at the specified SN node. At step 1212, the application specifies a send message to the ICR 122 to initialize a dialogue using the CRSPNewCall message and waits for instruction for next transaction. At step 1214, the ICR 122 responds with a TemporaryConnect message with a Destination Label specifying the Customer Premises VRU 124 and a Correlation ID. At step 1216, the SN platform 110 requests a destination label translation from the INCP 108. At step 1218, the INCP 108 responds with the switch/trunk group specification the Premises VRU 124.

At step 1220, the SN platform 110 bridges the call to the Premises VRU 124 sending the Correlation ID and waits for the next instruction. At step 1222, the Premises VRU 124 interacts with the caller 102 and then requests a transfer destination from the ICR 122 using the same Correlation ID. At step 1224, the ICR 122 receives request from the VRU 124, determines desired agent 128 destination and agent availability, and since an agent 128 is available sends a Connect message to the SN platform 110 for that agent.

At step 1226, the SN platform 110 requests a destination label translation from the INCP 108. At step 1228, the INCP 108 responds with the switch/trunk group specification for the agent 128. At step 1230, the SN platform 110 breaks a bridge to the Premises VRU 124 and bridges the call to the new switch/truck group specified by the INCP 108. At step 1232, the ACD 126 transfers the call to the specified agent 128.

Figure 13:
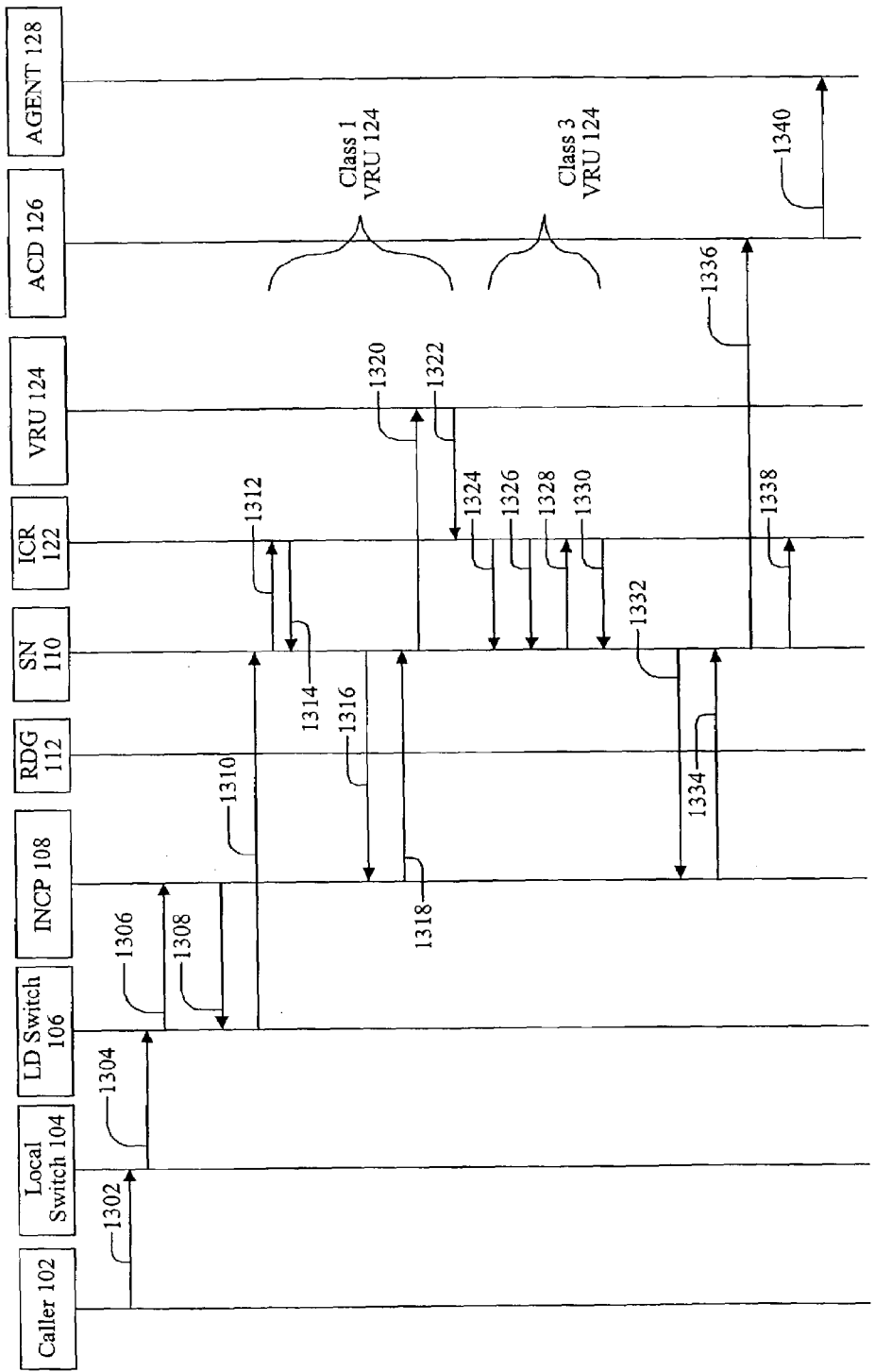
FIG. 13 is a diagram of Customer Premises VRU Call Flow with Parking employed with an exemplary intelligent call router, according to an embodiment of the present invention.

FIG. 13 illustrates an exemplary Customer Premises VRU 124 Call Flows with Parking. In FIG. 13, the Caller 102 Dials, for example, an 8XX number at step 1302. At step 1304, the LEC Switch 104 performs SMS/8XX database lookup, selects the NIVR platform 130 service provider as a destination carrier and delivers call to the long distance switch 106. At step 1306, the long distance switch 106 analyzes the dialed digits, and, since an 8XX number was dialed, queries the INCP 108 for routing instructions.

At step 1308, the INCP 108 encounters an SN platform 110 trigger point in Toll-free number translation and uses the load balancing information provided by the SN platform 110 to determine which SN node to send the call to. The INCP 108 responds to the long distance switch 106 with the Switch/trunk group associated to that particular SN node and outpulse digits specifying the application ID to be used.

At step 1310, the long distance switch 106 terminates the call at the specified SN node. At step 1312, the application specifies a send message to the ICR 122 to initialize a dialogue using the CRSPNewCall message and waits for instruction for next transaction. At step 1314, the ICR 122 responds with a TemporaryConnect message with a Destination Label specifying the Customer Premises VRU 124 and a Correlation ID. At step 1316, the SN platform 110 requests a destination label translation from the INCP 108. At step 1318, the INCP 108 responds with the switch/trunk group specification the Premises VRU 124.

At step 1320, the SN platform 110 bridges the call to the Premises VRU 124 sending the Correlation ID and waits for the next instruction in a WAIT SIBB. At step 1322, the Premises VRU 124 interacts with the caller 102 and then requests a transfer destination from the ICR 122 using the same Correlation ID.

At step 1324, the ICR 122 receives request from the VRU 124, determines desired agent 128 destination and agent availability, and since an agent 128 is not available sends the SN platform 110 a RUN_SCRIPT_REQUEST specifying the parking application. SN breaks the Bridge to the Prem VRU and jumps to the parking application and waits for the next instruction from the ICR 122.

At step 1326, the ICR 122 detects a configuration change with the intended agent 128 and sends a VRUCancel message to the SN platform 110. At step 1328, the SN platform 110 responds with a CRSPDialogueErrorResult message with the error code set to canceled indicating that the script has been canceled and then waits for the next instruction. At step 1330, the ICR 122 sends a CONNECT message with the destination label specifying the intended agent 128.

At step 1332, the SN platform 110 requests a destination label translation from the INCP 108. At step 1334, the INCP 108 responds with the switch/trunk group specification for the agent 128. At step 1336, the SN platform 110 bridges the call to the new switch/truck group specified by the INCP 108. At step 1338, the SN platform 110 sends an event status to the ICR 122 and waits for the next instruction. At step 1340, the ACD 126 transfers the call to the specified agent 128.

All or a portion of the invention (e.g., as described with respect to FIGS. 1–13) can be conveniently implemented using one or more conventional general purpose computers, microprocessors, digital signal processors, micro-controllers, etc., programmed according to the teachings of the present invention (e.g., using the computer system of FIG. 14), as will be appreciated by those skilled in the computer art. Appropriate software can be readily prepared by programmers of ordinary skill based on the teachings of the present disclosure, as will be appreciated by those skilled in the software art. In addition, the present invention (e.g., as described with respect to FIGS. 1–13) can be implemented by the preparation of application-specific integrated circuits or by interconnecting an appropriate network of conventional component circuits, as will be appreciated by those skilled in the electrical art(s). Further, the present invention can be implemented on the World Wide Web (e.g., using the computer system of FIG. 14).

Figure 14:
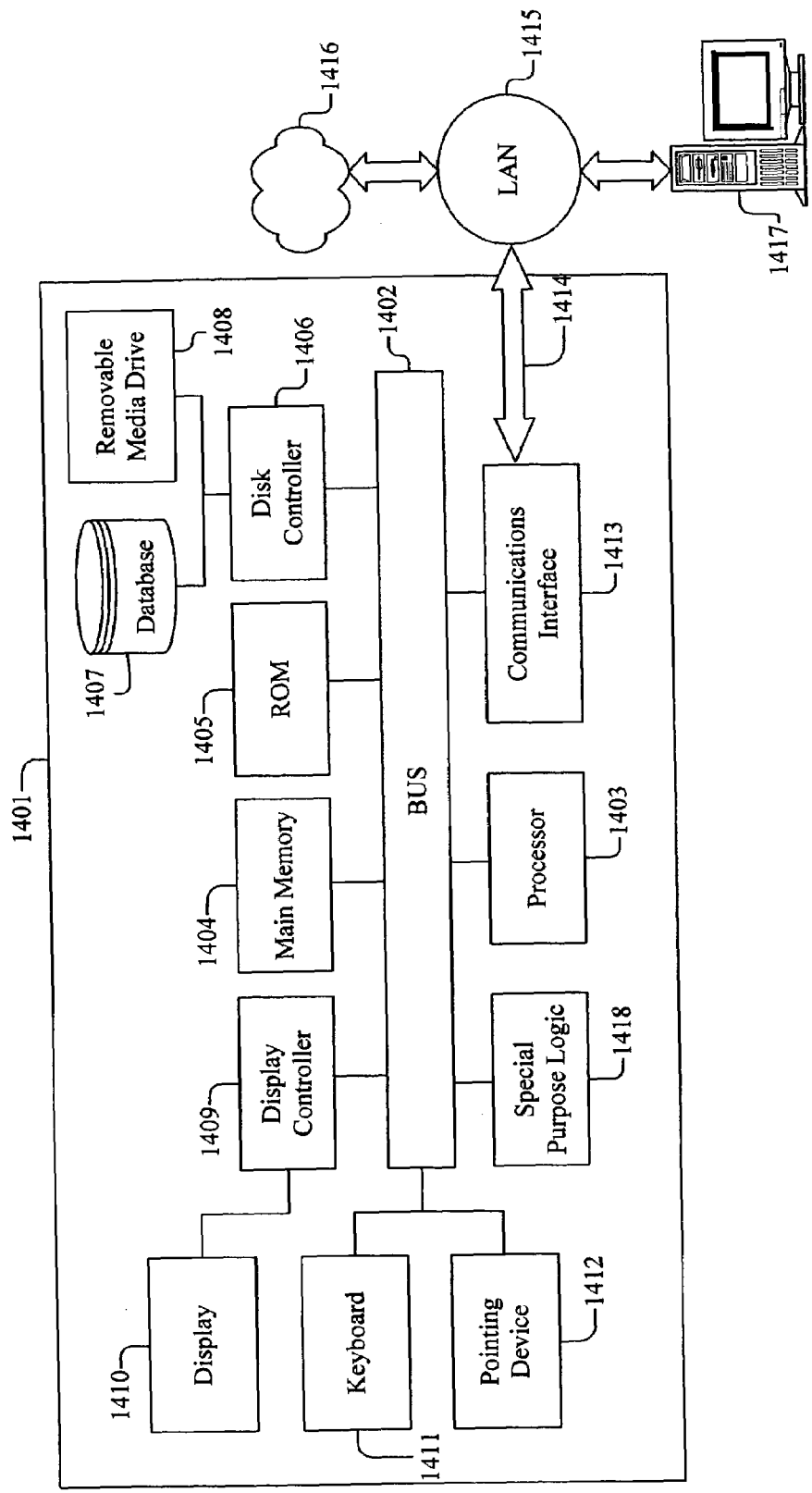
FIG. 14 is an exemplary computer system, which can be programmed to perform one or more of the processes of the present invention.

FIG. 14 illustrates a computer system 1401 upon which the present invention (e.g., devices 102–128, etc.) can be implemented. The present invention can be implemented on a single such computer system or a collection of multiple such computer systems. The computer system 1401 includes a bus 1402 or other communication mechanism for communicating information, and a processor 1403 coupled to the bus 1402 for processing the information. The computer system 1401 also includes a main memory 1404, such as a random access memory (RAM), other dynamic storage device (e.g., dynamic RAM (DRAM), static RAM (SRAM), synchronous DRAM (SDRAM)), etc., coupled to the bus 1402 for storing information and instructions to be executed by the processor 1403. In addition, the main memory 1404 can also be used for storing temporary variables or other intermediate information during the execution of instructions by the processor 1403. The computer system 1401 further includes a read only memory (ROM) 1405 or other static storage device (e.g., programmable ROM (PROM), erasable PROM (EPROM), electrically erasable PROM (EEPROM), etc.) coupled to the bus 1402 for storing static information and instructions.

The computer system 1401 also includes a disk controller 1406 coupled to the bus 1402 to control one or more storage devices for storing information and instructions, such as a magnetic hard disk 1407, and a removable media drive 1408 (e.g., floppy disk drive, read-only compact disc drive, read/write compact disc drive, compact disc jukebox, tape drive, and removable magneto-optical drive). The storage devices can be added to the computer system 1401 using an appropriate device interface (e.g., small computer system interface (SCSI), integrated device electronics (IDE), enhanced-IDE (E-IDE), direct memory access (DMA), or ultra-DMA).

The computer system 1401 can also include special purpose logic devices 1418, such as application specific integrated circuits (ASICs), full custom chips, configurable logic devices (e.g., simple programmable logic devices (SPLDs), complex programmable logic devices (CPLDs), field programmable gate arrays (FPGAs), etc.), etc., for performing special processing functions, such as signal processing, image processing, speech processing, voice recognition, infrared (IR) data communications, telephony functions, etc.

The computer system 1401 can also include a display controller 1409 coupled to the bus 1402 to control a display 1410, such as a cathode ray tube (CRT), liquid crystal display (LCD), active matrix display, plasma display, touch display, etc., for displaying or conveying information to a computer user. The computer system includes input devices, such as a keyboard 1411 including alphanumeric and other keys and a pointing device 1412, for interacting with a computer user and providing information to the processor 1403. The pointing device 1412, for example, can be a mouse, a trackball, a pointing stick, etc., or voice recognition processor, etc., for communicating direction information and command selections to the processor 1403 and for controlling cursor movement on the display 1410. In addition, a printer can provide printed listings of the data structures/information of the system shown in FIGS. 1–13, or any other data stored and/or generated by the computer system 1401.

The computer system 1401 performs a portion or all of the processing steps of the invention in response to the processor 1403 executing one or more sequences of one or more instructions contained in a memory, such as the main memory 1404. Such instructions can be read into the main memory 1404 from another computer readable medium, such as a hard disk 1407 or a removable media drive 1408. Execution of the arrangement of instructions contained in the main memory 1404 causes the processor 1403 to perform the process steps described herein. One or more processors in a multi-processing arrangement can also be employed to execute the sequences of instructions contained in main memory 1404. In alternative embodiments, hard-wired circuitry can be used in place of or in combination with software instructions. Thus, embodiments of the present invention are not limited to any specific combination of hardware circuitry and/or software.

Stored on any one or on a combination of computer readable media, the present invention includes software for controlling the computer system 1401, for driving a device or devices for implementing the invention, and for enabling the computer system 1401 to interact with a human user (e.g., a user of the devices 102–128, etc.). Such software can include, but is not limited to, device drivers, operating systems, development tools, and applications software. Such computer readable media further includes the computer program product of the present invention for performing all or a portion (if processing is distributed) of the processing performed in implementing the invention. Computer code devices of the present invention can be any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the present invention can be distributed for better performance, reliability, and/or cost.

The computer system 1401 also includes a communication interface 1413 coupled to the bus 1402. The communication interface 1413 provides a two-way data communication coupling to a network link 1414 that is connected to, for example, a local area network (LAN) 1415, or to another communications network 1416, such as the Internet. For example, the communication interface 1413 can be a digital subscriber line (DSL) card or modem, an integrated services digital network (ISDN) card, a cable modem, a telephone modem, etc., to provide a data communication connection to a corresponding type of telephone line. As another example, communication interface 1413 can be a local area network (LAN) card (e.g., for Ethernet™, an Asynchronous Transfer Model (ATM) network, etc.), etc., to provide a data communication connection to a compatible LAN. Wireless links can also be implemented. In any such implementation, communication interface 1413 sends and receives electrical, electromagnetic and/or optical signals that carry digital data streams representing various types of information. Further, the communication interface 1413 can include peripheral interface devices, such as a Universal Serial Bus (USB) interface, a PCMCIA (Personal Computer Memory Card International Association) interface, etc.

The network link 1414 typically provides data communication through one or more networks to other data devices. For example, the network link 1414 can provide a connection through local area network (LAN) 1415 to a host computer 1417, which has connectivity to a network 1416 (e.g. a wide area network (WAN) or the global packet data communication network now commonly referred to as the "Internet") or to data equipment operated by service provider. The local network 1415 and network 1416 both use electrical, electromagnetic and/or optical signals to convey information and instructions. The signals through the various networks and the signals on network link 1414 and through communication interface 1413, which communicate digital data with computer system 1401, are exemplary forms of carrier waves bearing the information and instructions.

The computer system 1401 can send messages and receive data, including program code, through the network(s), network link 1414 and communication interface 1413. In an Internet example, a server (not shown) might transmit requested code belonging to an application program for implementing an embodiment of the present invention through the network 1416, LAN 1415 and communication interface 1413. The processor 1403 can execute the transmitted code while being received and/or store the code in storage devices 1407 or 1408 or other non-volatile storage for later execution. In this manner, computer system 1401 can obtain application code in the form of a carrier wave. With the system of FIG. 14, the present invention can be implemented on the Internet as a Web Server 1401 performing one or more of the processes according to the present invention for one or more computers coupled to the Web server 1401 through the network 1416 coupled to the network link 1414.

The term "computer readable medium" as used herein refers to any medium that participates in providing instructions to the processor 1403 for execution. Such a medium can take many forms, including but not limited to, non-volatile media, volatile media, transmission media, etc. Non-volatile media include, for example, optical or magnetic disks, magneto-optical disks, etc., such as the hard disk 1407 or the removable media drive 1408. Volatile media include dynamic memory, etc., such as the main memory 1404. Transmission media include coaxial cables, copper wire, fiber optics, including the wires that make up the bus 1402. Transmission media can also take the form of acoustic, optical, or electromagnetic waves, such as those generated during radio frequency (RF) and infrared (IR) data communications. As stated above, the computer system 1401 includes at least one computer readable medium or memory for holding instructions programmed according to the teachings of the invention and for containing data structures, tables, records, or other data described herein. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the present invention can initially be borne on a magnetic disk of a remote computer connected to either of networks 1415 and 1416. In such a scenario, the remote computer loads the instructions into main memory and sends the instructions, for example, over a telephone line using a modem. A modem of a local computer system receives the data on the telephone line and uses an infrared transmitter to convert the data to an infrared signal and transmit the infrared signal to a portable computing device, such as a personal digital assistant (PDA), a laptop, an Internet appliance, etc. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Although the present invention is described in terms of a, circuit-switched (e.g., Time Division Multiplexed (TDM)) communications networks, the present invention is applicable to other types of networks, such as Voice Over Internet Protocol (VoIP) local service, international, etc., networks, as will be appreciated by those skilled in the relevant art(s).

Although the present invention is described in terms of telephony applications, the present invention is applicable to other types applications, such as voice-over-IP (VoIP) applications, etc., by including an appropriate gateway between the callers 102 and the local switch 104, as will be appreciated by those skilled in the relevant art(s).

Although the present invention is described in terms of the SN platform 110 providing an automated voice response menu in a telephony application, the present invention is applicable to other types of menus, such as computer generated menus, etc., used in other applications, such as instant messaging applications, Internet Relay Chat (IRC) applications, etc., as will be appreciated by those skilled in the relevant art(s).

While the present invention has been described in connection with a number of embodiments and implementations, the present invention is not so limited but rather covers various modifications and equivalent arrangements, which fall within the purview of the appended claims.

What is claimed is:

1. A communications system for supporting interactive voice response and call routing, comprising:
    a voice response platform having switching functionality and being configured to generate an automated menu in response to a received call, the menu including an option to transfer the call to an available agent via the switching functionality;
    an intelligent call router communicating with the voice response platform and configured to receive a request for the available agent and transmit identification information for the available agent to the voice response platform, wherein the voice response platform transfers the call to the available agent based on the identification information for the available agent, wherein the voice response platform is further configured to queue the received call until the available agent becomes available; and
    a router gateway in communication with the intelligent call router and configured to translate the request for the available agent to a format used by the intelligent call router.

2. The system of claim 1, wherein the voice response platform comprises one or more voice response platform nodes.

3. The system of claim 1, wherein the router gateway comprises one or more router gateway nodes.

4. The system of claim 1, further comprising:
    an intelligent network control point coupled to the voice response platform and configured to receive the identification information for the available agent and to generate routing information based thereon,
    wherein the voice response platform transfers the call to the available agent based on the routing information.

5. The system of claim 4, wherein the routing information comprises switch trunk information.

6. The system of claim 4, further comprising:
a remote data gateway coupled between the intelligent network control point and the intelligent call router and configured to translate routing directions from the intelligent call router to a format used by the intelligent network control point.

7. The system of claim 6, further comprising:
a communications network configured to couple the remote data gateway and the intelligent call router.

8. The system of claim 4, further comprising:
a long distance switch configured to couple the voice response platform and the intelligent network control point to a local switch.

9. The system of claim 8, wherein the local switch connects one or more callers to the long distance switch.

10. The system of claim 1, wherein the voice response platform interacts via audio and dual-tone multifrequency (DTMF) with both calling and called parties.

11. The system of claim 1, further comprising:
an automatic call distributor coupled between the intelligent call router and one or more agent workstations and configured to route the call to the available agent.

12. The system of claim 11, wherein the one or more agent workstations are configured to receive the call and generate an out-of-band message for transferring the call to another agent.

13. The system of claim 12, wherein the one or more agent workstations generate the out-of-band message for transferring the call to the another agent via selection of one of a button and menu provided via a client application running on the one or more agent workstations.

14. The system of claim 1, wherein the intelligent call router is configured to monitor for the available agent and to send a message to the voice response platform when no agent is available, and the voice response platform queues the call until the intelligent call router transmits the identification information for the available agent.

15. The system of claim 14, wherein the intelligent call router is configured to monitor an automatic call distributor for the available agent.

16. The system of claim 1, wherein after the voice response platform transfers the call to the available agent, the available agent transfers the call to another agent by sending an out-of-band message for transferring the call to the another agent.

17. The system of claim 16, wherein the available agent generates the out-of-band message for transferring the call to the another agent via selection of one of a button and menu provided via a client application running on a workstation of the available agent.

18. The system of claim 1, wherein the voice response system is operated by a service provider, and the intelligent call router is a customer premises equipment.

19. A method for supporting interactive voice response and call routing, the method comprising:
generating an automated menu in response to a received call at a voice response platform, the menu including an option to transfer the call to an available agent;
transmitting a request for the available agent from the voice response platform to an intelligent call router, wherein the intelligent call router receives the request and transmits identification information for the available agent to the voice response platform;
transferring the call to the available agent by the voice response platform based on the identification information for the available agent, wherein the voice response platform queues the received call until the available agent becomes available; and
translating the request for the available agent to a format used by the intelligent call router via a router gateway in communication with the intelligent call router.

20. The method of claim 19, wherein the voice response platform comprises one or more voice response platform nodes.

21. The method of claim 19, wherein the router gateway in the translating step comprises one or more router gateway nodes.

22. The method of claim 19, further comprising:
receiving the identification information for the available agent and generating routing information based thereon via an intelligent network control point coupled to the voice response platform; and
transferring the call to the available agent based on the routing information via the voice response platform.

23. The method of claim 22, wherein the routing information in the receiving step comprises switch trunk information.

24. The method of claim 22, further comprising:
translating routing directions from the intelligent call router to a format used by the intelligent network control point via a remote data gateway coupled between the intelligent network control point and the intelligent call router.

25. The method of claim 19, further comprising:
interacting via audio and dual-tone multifrequency (DTMF) with both calling and called parties via a voice response unit coupled to the intelligent call router.

26. The method of claim 19, further comprising:
routing the call to the available agent via an automatic call distributor coupled between the intelligent call router and one or more agent workstations.

27. The method of claim 26, further comprising:
generating an out-of-band message for transferring the call to another agent via the one or more agent workstations.

28. The method of claim 26, wherein the generating step is initiated via selection of one of a button and menu provided via a client application running on the one or more agent workstations.

29. The method of claim 19, further comprising:
monitoring for the available agent;
selectively sending a message to the voice response platform when no agent is available via the intelligent call router; and
queuing the call until the intelligent call router transmits the identification information for the available agent via the voice response platform.

30. The method of claim 29, further comprising:
monitoring an automatic call distributor for the available agent via the intelligent call router.

31. The method of claim 19, further comprising:
after transferring the call to the available agent, sending an out-of-band message for transferring the call to another agent via the available agent.

32. A communications system for supporting interactive voice response and call routing, comprising:
means for generating an automated menu in response to a received call at a voice response platform, the menu including an option to transfer the call to an available agent;

means for transmitting a request for the available agent from the voice response platform to an intelligent call router, wherein the intelligent call router receives the request and transmits identification information for the available agent to the voice response platform;

means for transferring the call to the available agent by the voice response platform based on the identification information for the available agent, wherein the voice response platform queues the received call until the available agent becomes available; and means for translating the request for the available agent to a format used by the intelligent call router via a router gateway in communication with the intelligent call router.

* * * * *